United States Patent [19]
Bromley et al.

[11] Patent Number: 5,819,263
[45] Date of Patent: Oct. 6, 1998

[54] FINANCIAL PLANNING SYSTEM INCORPORATING RELATIONSHIP AND GROUP MANAGEMENT

[75] Inventors: John W. Bromley, Plymouth, Minn.; David A. Brounley, Roanoke, Va.; Howard R. Hallin, Golden Valley, Minn.

[73] Assignee: American Express Financial Corporation, Minneapolis, Minn.

[21] Appl. No.: 684,344

[22] Filed: Jul. 19, 1996

[51] Int. Cl.⁶ ........................................................ G06F 7/08
[52] U.S. Cl. ..................................... 707/3; 705/3; 705/10; 345/163; 345/348
[58] Field of Search ........................................ 395/603, 611, 395/200.09, 202, 222; 707/3, 200; 705/3, 10, 36; 345/348, 163

[56] References Cited

U.S. PATENT DOCUMENTS

| | | | |
|---|---|---|---|
| 5,319,543 | 6/1994 | Wilhelm | 364/401 |
| 5,319,777 | 6/1994 | Perez | 395/600 |
| 5,361,199 | 11/1994 | Shoquist | 364/401 |
| 5,371,675 | 12/1994 | Greif et al. | 364/419.1 |
| 5,410,693 | 4/1995 | Yu et al. | 395/600 |
| 5,452,416 | 9/1995 | Hilton et al. | 395/61 |
| 5,546,577 | 8/1996 | Marlin et al. | 395/600 |
| 5,611,048 | 3/1997 | Jacobs et al. | 395/200.09 |
| 5,649,192 | 7/1997 | Stucky | 395/614 |
| 5,652,908 | 7/1997 | Douglas et al. | 395/800 |
| 5,694,561 | 12/1997 | Malamund et al. | 395/346 |

OTHER PUBLICATIONS

Shaw et al., "Microsoft Office 6 in 1", Que Corporation, pp. 608–609, 631–633, 644, 713–717, 1994.

Primary Examiner—Thomas G. Black
Assistant Examiner—Jean R. Homere
Attorney, Agent, or Firm—Snell & Wilmer L.L.P.

[57] ABSTRACT

An advisor can provide proactive, efficient service to clients through the use of the present group management system. The system is an effective work management tool that efficiently organizes an advisor's day-to-day operations, work flow, clients and prospects. To allow coordinated consultation based not only on an individual's demographic information, but also on the individual's relationships to others, people and organizations are arranged into client groups and prospect groups. An advisor can analyze an individual's relationship with his/her family, business and pension to provide overall financial planning and security. The group management system includes numerous innovative, coordinated features including security measures, an easily accessible FRONT PANEL, a simplified SEARCH ENGINE, and the ability to refresh data. The grouping of clients in the CARD FILE enables the DRAG and DROP function to initialize applications without the need for repeated input of data. The REFRESH, ON-LINE CLIENT DATA, FIELD DATA CAPTURE and EXPORT features allow communication with a host database or other local databases.

33 Claims, 25 Drawing Sheets

FIG. 6

| ✓ | CLIENT: DATA REFRESHES | | | | |
|---|---|---|---|---|---|
| ACTIONS | REQUEST | SORT ORDER | HELP | | |
| ACTION | REQUEST TYPE | DESCRIPTION | DATE/TIME | USER | STATUS |
| | GROUP REFRESH | KERR, GEOFFREY AND | 07-16-96 02:47:00 | Z64904 | READY |
| | GROUP REFRESH | HUTCHINGS, ANTHONY | 07-16-96 02:48:00 | Z64904 | READY |
| | GLOBAL REFRESH | | 07-19-96 11:38:00 | Z64904 | IN PROCESS |

| SET TO RECEIVE | SET TO CANCEL | CLEAR ACTION | DO IT |
|---|---|---|---|

GROUP: (NEW) PROSPECT INFORMATION

PROSPECT  SELECTED  HELP

NAMES
| | FIRST | MIDDLE | LAST | PREFERRED |
|---|---|---|---|---|
| 1ST PROSPECT | | | | |
| 2ND PROSPECT | | | | |

ADDRESS—MAIN RESIDENCE

CITY: MINNEAPOLIS  STATE: MN  ZIP CODE:

PHONE
| | NUMBER | BEST TIME TO CALL | |
|---|---|---|---|
| HOME | | | ☐ DON'T CALL |
| WORK | | | |

CLIENT ACQUISITION
TECHNIQUE   NUMBER

RECOMMENDED BY
[ADD PERSON]  [REMOVE PERSON]

PRIMARY INTERESTS

SALUTATION(DEAR:)

MAILING NAME

EMPLOYER(1ST PROSPECT)   TARGET MARKET

EMPLOYER(2ND PROSPECT)   MARKET SEGMENT

[SAVE RETURN]  [SAVE ADD ANOTHER]  [CANCEL]   NEXT CONTACT UNSCHEDULED
☑ OPEN AS PROSPECT VIEW

FIG. 8A

FINANCIAL PLANNING SYSTEM INCORPORATING RELATIONSHIP AND GROUP MANAGEMENT

REFERENCE TO RELATED DOCUMENTS

A microfiche copy of the object classes of a computer program suitable for use as a group management system is being tendered as an appendix hereto. The object classes are modules of code representing real world objects. Each object class is a combination of data, behavior for that data and relationship of the data to other classes.

A portion of the disclosure of this patent document contains material to which a claim for copyright is made. The copyright owner has no objection to the facsimile reproduction by anyone of the patent document or patent disclosure, as it appears in the Patent and Trademark Office patent file or records, but reserves all other copyrights whatsoever.

TECHNICAL FIELD OF THE INVENTION

The present invention generally relates to a computer-implemented program for a group management system and more particularly to a computer-implemented program for performing tasks for groupings of clients and prospective clients in the financial planning industry.

BACKGROUND OF THE INVENTION

For people to achieve their personal and financial objectives, they typically require a long-term relationship with a trusted and knowledgeable advisor who can help them achieve their objectives in a prudent and thoughtful manner. Achieving objectives often involves financial planning, thus a large segment of the advising (or client management) industry is transaction based. Strong one-on-one relationships with clients usually allow an advisor to consult with clients regarding their objectives, and subsequently, conduct financial transactions for the clients. Initiating, building and maintaining long-term advisory relationships with a client is typically crucial for a successful advisor. All barriers to client relationship acquisition and maintenance (i.e. service delays and errors, lack of information, poor product performance and the like) should be identified and eliminated in order to remain competitive. Hence, corporations are continually searching for the best method to foster and maintain relationships with clients.

More companies are hiring advisors to acquire and service clients, with the company typically requiring constant contact with the advisor. Advisors find prospective clients and attempt to create a rapport with the clients in order to gain their trust and ultimately obtain their business. The actual financial products are provided by the company, but the advisor is usually the person who interacts with client questions and concerns. However, in practice, the advisor typically does not provide sufficient contact with the company. The lack of communication between the field and the central organization often means that effective methods and systems are reinvented in different locations. In many client management systems, advisors keep their personal client information locally on a closed system apart from the facilities of the corporate office. An exclusively local database often requires that advisors re-enter data multiple times as they work through the planning process with clients. Failure to get the proper information usually creates delays and many times leads to the loss of clients. A system is needed that can communicate with a host database which will consistently update data and services, thus allowing an advisor to provide immediate, current information to clients.

To provide these services, advisors typically need an effective work management tool that efficiently organizes their day-to-day operations, work flow, clients and prospects. For many years, the client management industry has attempted create an optimal system to service its clients. Because companies are often concerned that their advisors spend too much time performing administrative or clerical tasks not related to client development, the client management system needs to allow the advisor to concentrate on customer service.

Current methods of client acquisition and client maintenance often include poorly tailored techniques, such as "cold calling." The purchasing profile of clients is evolving such that consumers demand real time solutions to their problems. Therefore, service providers need the capability to update and communicate with prospects and customers via advanced management technology. A system is needed that incorporates a menu of techniques that allow focus teams and advisors to select techniques, other than "cold calling", that are the most appropriate and cost effective based on local market opportunities.

A key to the success of client acquisition is accessibility of information, such as demographics, profitability of client, trigger events and other soft data that is typically deemed appropriate by the advisor to successfully take advantage of market and relationship-building opportunities. At any time, clients usually want to know how their financial portfolio is achieving their relationship goals. A failure of the client management industry is the lack of goal tracking. Clients continually ask, "How am I doing?" Advisors should have "real time" access to client data, i.e., transaction records and client history. Access often allows for problem resolution, answering client questions, providing information for scheduled client reviews and tracking clients goals. The ability to provide immediate answers to a client would help support the relationship sought between the advisor and the client. Contact systems, presentation tools and data integration methods that are currently available are often cumbersome, slow, antiquated and manually intensive such that they do not meet the growing needs of field advisors. A user friendly group management system is needed to assist advisors to use information to create marketing plans, provide base information and tracking on referrals, and facilitate the transfer of information from the advisors in the field back to the marketing specialists in the corporate office or marketing division. Furthermore, a client typically expects an appropriate amount of information in clear and easy-to-understand statements from the advisor. A need exists for an improved client management and planning system with the ability to personalize plan contents to each client's unique situation and preferences.

Client acquisition and retention is usually a prime concern for corporations, along with cultivating each client relationship to its fullest potential. Client-base assets (i.e., recommendations and referrals that promote new business) are typically underutilized because assets are lost prematurely due to unsatisfactory service. As a major key to long-term growth, corporations need a system to help retain and deepen relationships with clients and earn as many recommendations/referrals as possible from existing clients by providing exceptional advice, service and value.

Research and advisor experience often shows that satisfied clients are much more likely to recommend the advisor's company to friends and business associates. The optimal client management system should provide, in each and every interaction, a variety of services, quick access to information, efficient retention of information, cross-referencing of information, and instant advice. Advisors should respond quickly to client inquiries and requests by, inter alia: (1) having immediate and easy access to client biographical information, account balances, and account activity, (2) obtaining tools or support to quickly and easily perform routine client service requests, i.e. address and beneficiary changes, basic new business transactions, etc., (3) having a simple interface system allowing local staff or team support to quickly and competently handle client service requests when the advisor is unavailable.

Access to information is typically a key to gain a competitive edge in the client management industry. A system is needed to achieve more effective communications with field advisors, improve morale in the field, achieve effective sales management and decision support, increase actual selling time of advisors, reduce telephone calls to a corporate office, facilitate lead generation and tracking, allow more accurate sales expense tracking, shorten the sales cycle, and increase the size of the field without having to increase the corporate office support.

Several management gaps exist in the client management industry which often affect client relations. Some advisors are not successful in managing and executing the business because of the difficulty in obtaining qualified prospects and the inconsistency in the quality of client service. Advisors typically lack a structured process for managing their business, do not have information to evaluate their business in a timely manner and spend disproportionately more of their time procuring appointments than they do conducting appointments.

Strategic processes for operationalizing key goals of corporations are often in great demand. An important goal of any corporation is client service and satisfaction in order to maintain the client relationship. Corporate representatives should have the ability to acquire, service, plan and track their interactions with clients. The ability to preform proactive client services and targeted marketing can typically result in increased productivity with a large cost benefit to a corporation. Currently, an optimal system that is patterned after the way a corporation interacts not only with clients, but also with groups and organizations, does not exist.

The current state of the art systems for client management often suffer from the principal disadvantages of not being tailored to financial planners and not able to group clients into marketable segments. Because existing systems are typically designed to only assist the advisors' interactions with a corporation representative (i.e. benefits manager), the existing systems only store simple demographic information about the client and employer. Although the benefits may be sold to an employer, the employees are often the individuals that need the customer service. Thus, the limited information found in existing systems typically does not provide enough information to the advisor for the advisor to effectively service clients. Current systems also do not often have the ability to conduct creative searches and perform key activities from these search results. The end result is that client relationships suffer due the lack of an efficient system to pass information to clients.

Advisors that are unprepared to meet clients' expectations and/or provide knowledgeable advice typically experience problems with identifying an incorrect need, identifying a prospect with a need but no further action is taken by the prospect, identifying a prospect with a need but no further action is taken by the advisor, or identifying a prospect without a need. Common problems with inefficient client management systems include an advisor not following up in a timely manner, the advisor not taking time to make sure the client understands the objectives, and the advisor not resolving client problems.

The foregoing explanation indicates that while conventional computer-implemented client management systems exist, they each suffer from the principal disadvantages of not being able to provide sufficient information, manage groups of clients and prospects, conduct creative searches and perform key activities from these results. A system and method is thus needed for providing group management which overcomes the shortcomings of the prior art. The present computer-implemented group management system contains important improvements and advances upon conventional client management systems by including unique grouping capabilities.

SUMMARY OF THE INVENTION

The present invention provides a system wherein, an advisor can provide proactive, efficient service to clients through the use of the present group management system. The system is an effective work management tool that efficiently organizes an advisor's day-to-day operations, work flow, clients and prospects. To allow coordinated consultation based not only on an individual's demographic information, but also on the individual's relationships to others, people and organizations are arranged into client groups and prospect groups. An advisor can analyze an individual's relationship with his/her family, business and pension to provide overall financial planning and security. Generally, an advisor utilizes a desktop to communicate with a mainframe through middleware. To operate the group management system, the advisor boots the system, the FRONT PANEL is displayed, an icon is selected, the advisor manipulates/inputs data and the advisor prints/sends data. The group management system includes numerous innovative, coordinated features including security measures, an easily accessible FRONT PANEL, a simplified SEARCH ENGINE, and the ability to refresh data. The grouping of clients in the CARD FILE enables the DRAG AND DROP function to initialize applications without the need for repeated input of data. The REFRESH, ON-LINE CLIENT DATA, FIELD DATA CAPTURE and EXPORT features allow communication with a host database or other local databases.

The advisor not only works with an individual, but the advisor works with all of the individual's relationships, including family, business, pensions and the like. Analysis of all client relationships provides a more accurate assessment of a client's financial position, and thus, often assists the individual in financial planning and achieving financial security. To achieve financial security, the system considers the client's account information in conjunction with the client's goals. The grouping of clients by specific criteria greatly enhances an advisor's ability to assist clients in achieving their relationship goals.

Oftentimes, success in the industry depends on an advisor's ability to identify and correct problems in a specific grouping of clients. Presently known schemes typically involve systems which only access individual accounts, without an efficient grouping strategy. Obviously, the advisors can manually reorganize all of their clients into specific groupings, but this would be a cumbersome, time-consuming process. Upon choosing an individual or organization in the present system, an advisor has the capability to access its respective grouping. The advisor also has the ability to create a group in a quick and efficient manner in order to allow the advisor to perform one task that covers the entire group. Instant access to group data helps advisors search the database and produce letters and reports for groups of similarly situated clients.

By establishing an effective system based on the grouping of clients, the present invention allows an advisor to analyze and support the groups. To conduct a proper analysis of each group, the advisor typically needs large amounts of information. The large amounts of group information in the present invention is organized in a system, such that the system can quickly and efficiently supply the advisor with needed information. The present system incorporates a substantial amount of client relationship and account information to enable the advisor to assist each client to accomplish his/her goals. From a corporate perspective, unique needs, expectations and behaviors of prospects in different market segments are often not well understood and addressed in marketing techniques and product and service offerings. The present system provides an analysis of needs, expectations and behaviors of prospects in related groupings to tailor products, services, pricing, marketing approaches, etc. to prospective clients' unique needs. The ability to divide a client base into key market segments (groups) is invaluable to a corporation, as well as an advisor.

These and other objects, features and advantages of the present invention will become more apparent to those skilled in the art from the following more detailed description of the non-limiting preferred embodiment of the invention taken with reference to the accompanying Figures.

BRIEF DESCRIPTION OF THE DRAWING FIGURES

Preferred exemplary embodiments of the present invention will hereinafter be described in conjunction with the appended drawing figures, wherein like numerals denote like elements and:

FIG. 6 is an exemplary screen view of an Account VIEW in accordance with one aspect of the present invention;

FIG. 6a is an exemplary screen view of a REFRESH VIEW that is displayed after selecting a STATUS button in accordance with one aspect of the present invention;

FIG. 7 is an exemplary screen view of a GROUP VIEW in accordance with one aspect of the present invention;

FIG. 8a is an exemplary screen view of a new PROSPECT field from a CARD FILE in accordance with one aspect of the present invention;

DETAILED DESCRIPTION OF PREFERRED EXEMPLARY EMBODIMENTS

Figure 1:
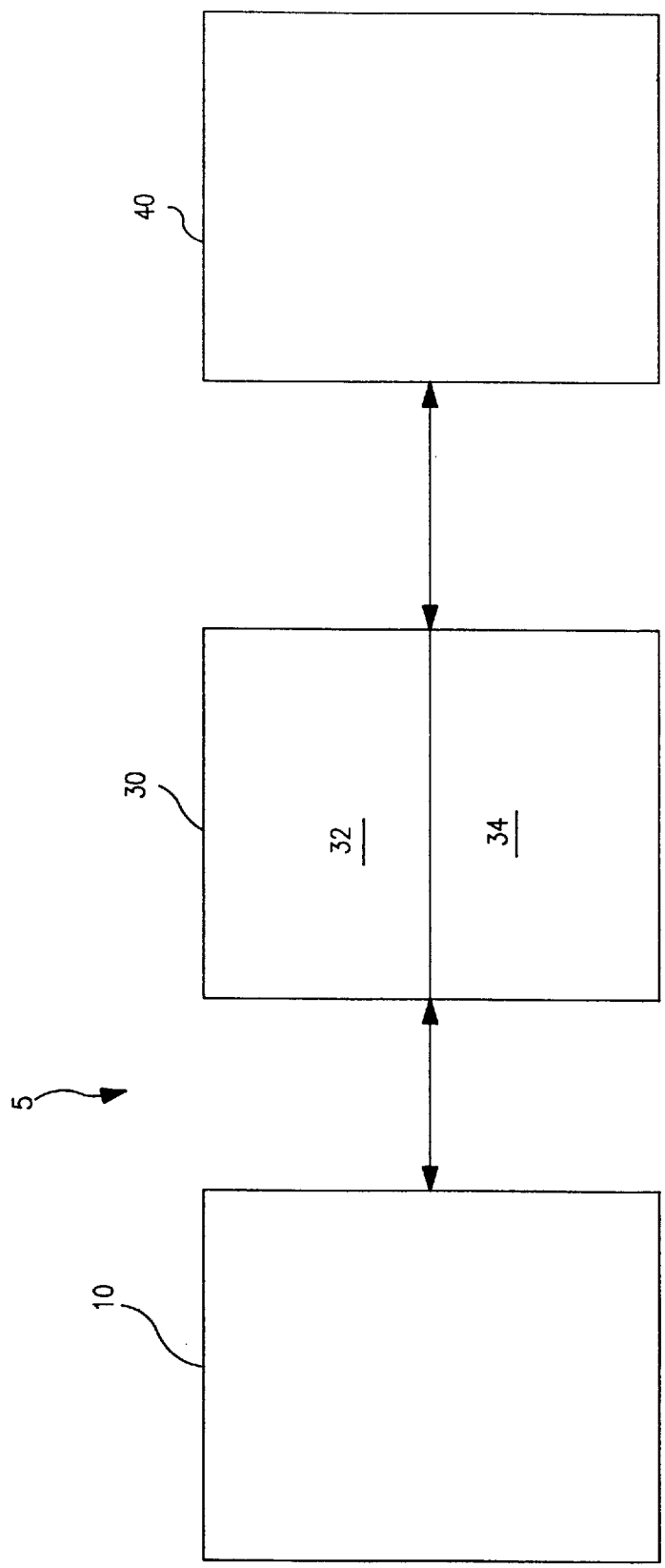
FIG. 1 is a schematic block diagram of a group management system in accordance with one aspect of the present invention.

In general, with reference to FIG. 1, a block diagram of a group management system network 5 in accordance with one aspect of the invention is shown. DESKTOP 10 suitably communicates with MIDDLEWARE 30 which contains a data utility (DU) 22 and a Staging Server (SS) 34. MIDDLEWARE 30 also suitably communicates with MAINFRAME 40. Those skilled in the art will appreciate that DESKTOP 10 may be any suitable computing device, such as a personal computer, laptop computer, or the like. Those skilled in the art will appreciate that DESKTOP 10, MIDDLEWARE 30 and MAINFRAME 40 include suitable computing hardware for effecting the functions set forth herein. In this regard, although a preferred exemplary embodiment of the present invention surrounds a group management system and method and apparatus for grouping clients, it will be understood that the invention is not so limited. In particular, it will be appreciated that the present invention contemplates virtually any type of management system or methodology for virtually any type of goods or services of whatever kind or nature, in that the methods and apparatus described herein for grouping and manipulating may be applied in any of these contexts.

As further explained below in the more detailed description, system 5 includes an inventive, efficient and effective combination of functions which provide grouping and organizational capabilities. These capabilities assist an advisor in providing effective consultation for achieving a customer's relationship goals. Through an expanded access to information, the functions of system 5 are designed to assist financial advisors in providing superior customer service. For example, prior art systems typically include about five basic informational fields for each customer, with about an additional ten user-defined fields which an advisor should have the skills to properly create and manipulate. System 5, however, includes over 250 active fields which contain a variety of information for use and manipulation by an advisor.

System 5 provides, through Planner Access to Client Data (PACD) as more fully explained below, accessibility of information, such as profitability of client, TRIGGERS 365 events and other soft data that is typically deemed appropriate by an advisor to successfully take advantage of market and relationship-building opportunities. This information is the key to the success of client acquisition and maintenance. System 5 allows advisors to provide clients, at any time, with information about how their financial portfolio is achieving their relationship goals. Thus, system 5 provides goal tracking with "real time" access to client data, i.e., transaction records and client history. The ability to provide immediate answers to a customer helps support the relationship sought between an advisor and the client.

System 5 assists advisors in using the information to create marketing plans, provide base information and tracking on referrals. Through REFRESHes, as further explained below, system 5 also facilitates the transfer of information to advisors in the field from the corporate office. Those skilled in the art will appreciate that when using corporation herein, corporation may include any entity, such as a partnership, conglomerate, sole proprietorship, charitable organization or the like. Furthermore, system 5 provides an appropriate amount of information in clear and easy-to-understand statements for the customer, thus providing personalized plan contents for each client's unique situation and preferences.

Figure 2:
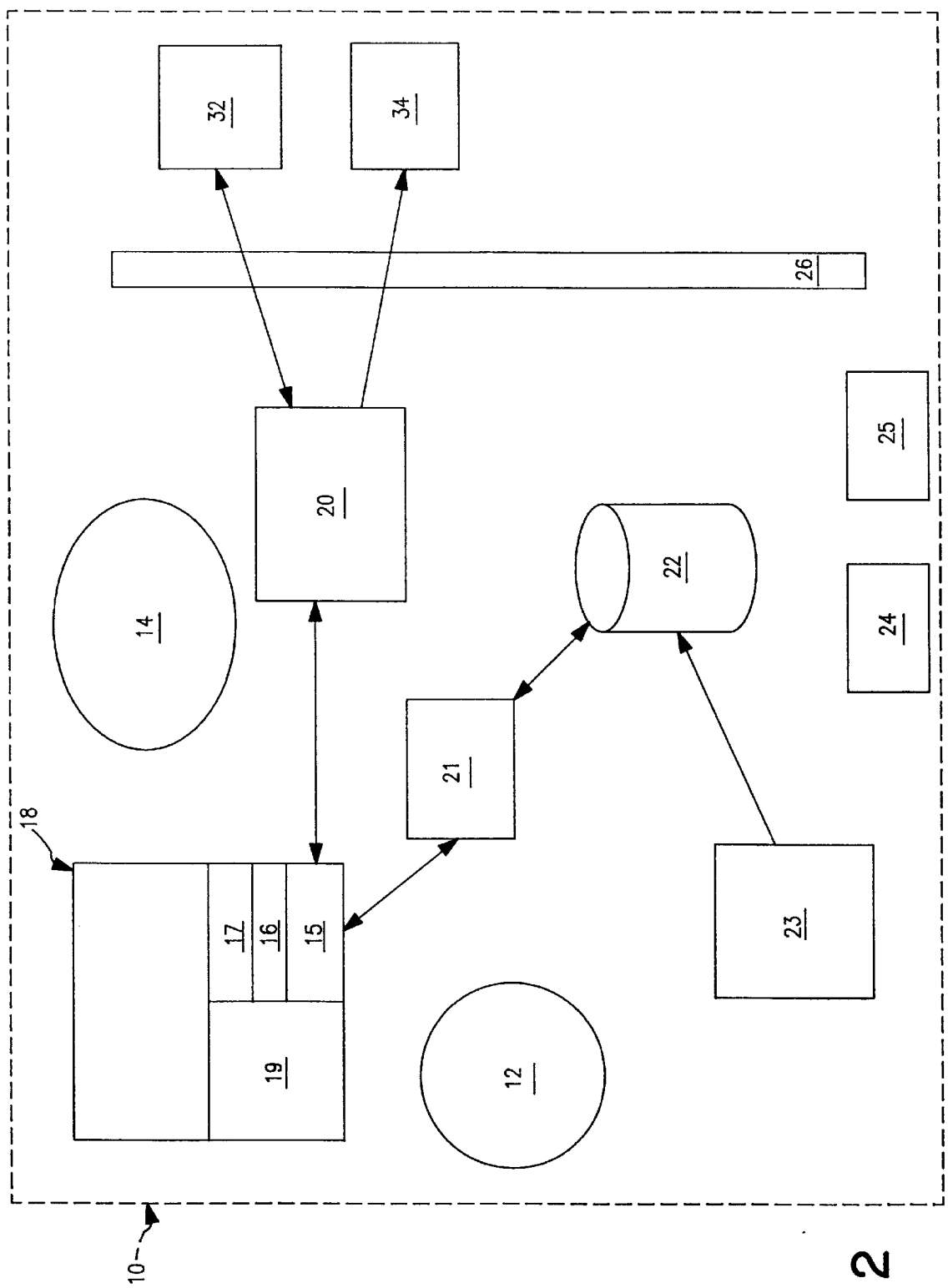
FIG. 2 is a block diagram of a desktop in accordance with one aspect of the present invention.

With reference to FIG. 2, a block diagram of DESKTOP 10 in accordance with one aspect of the invention is shown. DESKTOP 10 preferably includes, temporary data files 12, SYBASE OPEN client v10.0 15, Cs.Library 16, Ct.Library 17, APPLICATION 18 ODBC driver 19, IBM TCP/IP 20, database manager (DBM) 21, DB2/2 DATABASE 22 of tables/spaces, data extract 23, WPS SOM class 24 and WPS object 25. SYBASE OPEN client 15 allows attachment of DESKTOP 10 to a UNIX server 34 via TCP/IP, a local network or a dial-up connection and its use for this purpose is generally known. In a preferred embodiment, PK ZIP (DOS v2.04g, OS/2 v1.01) compresses data files, while BACK MASTER v1.2 is the back up software for backing up the computer tape and their use for this purpose is generally known. KOPY KAT v1.1 is a code that allows the system maintenance personnel to dial into DESKTOP 10 and conduct problem determination and its use for this purpose is generally known. DB2/2 22 is a prefered database embodiment, but any suitable database can be incorporated into system 5.

In a preferred embodiment of Workstation software (SW), the Installation Program includes Desktop Settings v2.4 and Lotus Smart Center v1.19.95. The APPLICATION LAYER includes WIN-OS Apps which includes MS Office v2.0m, DTI v8.0, INFOSERV v2.3.2, Tier 2 Apps., and OS/2 Apps. which includes CC MAIL Lan v.1.03, CC MAIL Rem v.2.1, AmiPro v.3.0b r30.963.0, 1-2-3 v.2.1, Freelance v2.1, Server Login v2.2, Backup/Rest v2.3, EXTRA! v2.02, RMS-PACD v2.4, FAST DB v2.4, Data Repl. v2.4, DB Populate v2.4, ACT!->RMS Data Conv. v2.3.2, and Server Login HELP 1320 v2.2. The ADMINISTRATIVE TOOLS include Docking Utility v2.2, BackMaster v1.2, KopyKat v1.1, PKZip DOS v2.04g, OS/2 v1.01, Shiva PW Sync v2.2, Talley NetCensus v2.5, Tier 2 Installer v2.2, IBM AV/2 v2.4 and LDS v2.4. The DATA ACCESS LAYER includes DB2/2 v1.2 and SYBASE OPEN client v10.0. The Network Utilities Layer includes IBM DIALS client v2.3. The NETWORK ACCESS LAYER includes NETWARE REQUESTOR v2.11+, IBM TCP/IP for OS/2 v2.0, TCP UDP, SPX, NCP, RIP, SAP, FTP, IP, IPX, NDIS, ODI2NDI, BOOTP v.2.2 and ODI.

In a preferred embodiment, DESKTOP 10 includes an application which is constructed with an object oriented application object model. This application provides the majority of functions local to DESKTOP 10. In a preferred embodiment, the persistent portion of the application object model will have a corresponding, isomorphic representation within a LOCAL DATABASE. To facilitate the isomorhic mapping between the application object model and local database, a persistence framework was built. The persistence framework handles the necessary persistence activities as well as the impedence matching between the application object model and DATABASE 22 preferred tables and keys.

With reference to FIG. 1, MIDDLEWARE 30 preferably includes any component between DESKTOP 10 and MAINFRAME 40. Exemplary main components of data utility MIDDLEWARE 30 are implemented using, in a preferred embodiment, the Data Utility Host Software OverVIEW Data Base & Mainframe Gateway—Server Configuration A (SDA) includes Security: Unix-Sun OS v4.1.3. The APPLICATION LAYER includes SQL Server v10.0.2.1 SWR 4009 and Netgateway v2.0 SWR 2728. No ADMINISTRATIVE TOOLS and no NETWORK UTILITIES LAYER exist. The NETWORK ACCESS LAYER includes SunLink SNA v7.0.1 (Patch 100916-05) (Peer-to-Peer Services), APPC, TCP/IP, Token Rink-LLC v2.1 and Ethernet.

In an alternative embodiment, Data Utility Host Software OverVIEW Data Utility Engine—Server Configuration B (SDB) includes Security: Unix-Sun OS v4.1.3. The APPLICATION LAYER includes RPC Server v5.0-P12, Super-Server v3.0-P9 and Open Server v10.0.2 SWR 4190. No ADMINISTRATIVE TOOLS and no NETWORK UTILITIES LAYER exists. The NETWORK ACCESS LAYER includes TCP/IP, Token Ring-LLC v2.1, Ethernet.

MIDDLEWARE staging server 34 preferably includes, in the APPLICATION LAYER, Middleware Applications v2.2. The ADMINISTRATIVE TOOLS include Tivoli UNIX Admin. Software v2.0.2 and Legato Backup software v4.1.3. The NETWORK UTILITIES LAYER includes FTP v9.04 and Sybase Open client v10.01. The NETWORK ACCESS LAYER includes TCP/IP v9.04 and HP ARPA Services v9.04.

In a preferred embodiment of the File Server (FS), the SECURITY (Novell Netware Administration) does not include an APPLICATION LAYER. The ADMINISTRATIVE TOOLS include Backup Exec v5.01, BootP v2.2, Anti-Virus (AV2) v2.3 and Talley NetCensus v2.5.1. The NETWORK UTILITIES LAYER includes Domain Services v2.3, CIM v2.4 and Netware Mgmt. Agents v1.6. The NETWORK ACCESS LAYER includes Netware v3.12, ODI, IPX/SPX and TCP/IP vNovell.

In a preferred embodiment, the cc: Mail Router (SM) includes SECURITY—OS/2 Lockup. The APPLICATION LAYER includes cc: Mail Router, Field—v5.11 and Campus—v5.13. No DATA ACCESS LAYER exists in the cc: Mail Router (SM). The NETWORK ACCESS LAYER includes Netware Requester v2.11, ODI and IPX/SPX.

In a preferred embodiment of the AutoFile Server (SA), the APPLICATION LAYER includes Informix (DBMS)

v5.01, AutoFile Applications and Storage Manager (Recognition software) v2.02. The ADMINISTRATIVE TOOLS include Proprietary Monitoring Software and HP DataPair (Mirroring software). The NETWORK UTILITIES LAYER includes Informix Star v5.0. The NETWORK ACCESS LAYER includes TCP/IP, HP ARPA Services.

Figure 3:
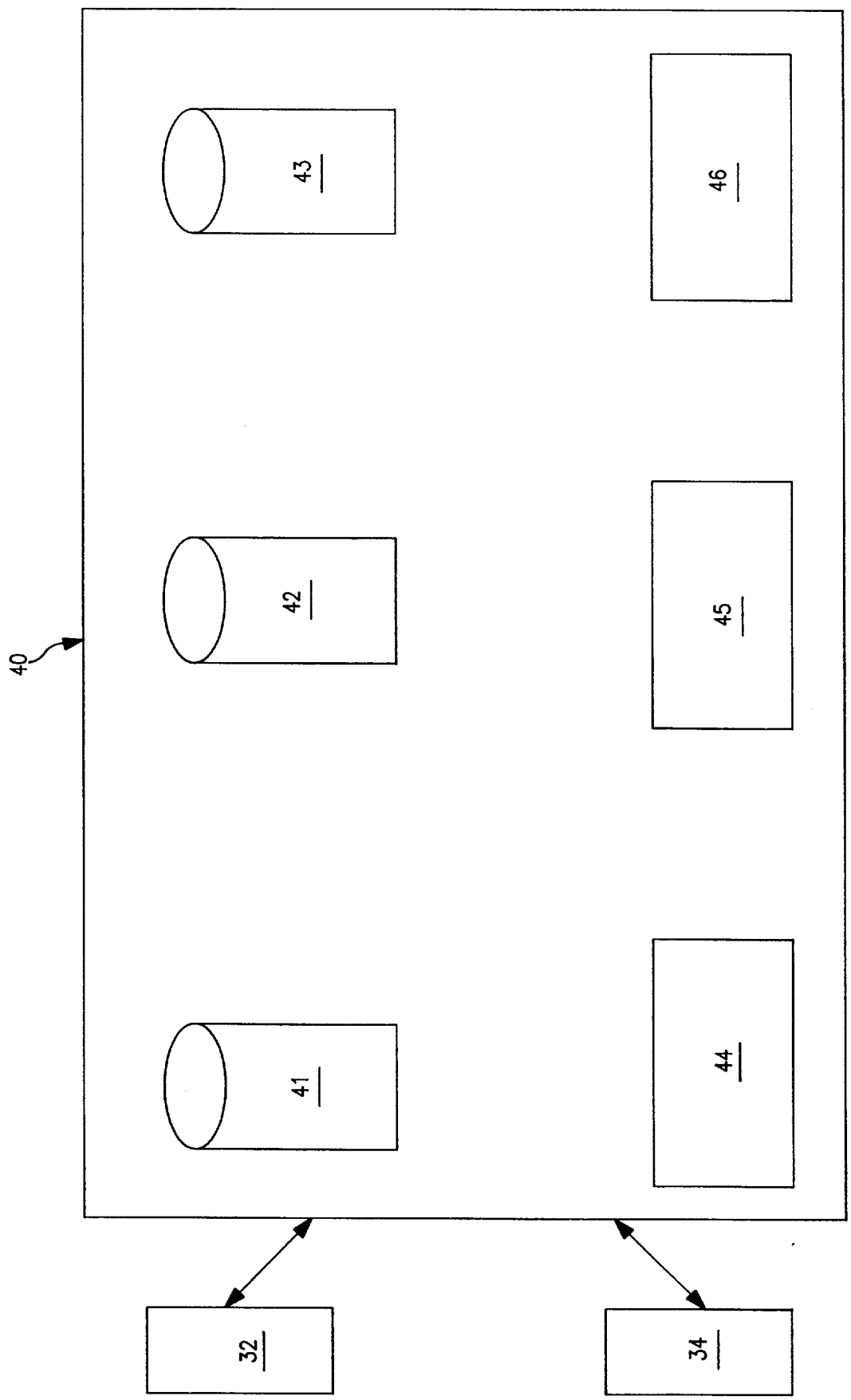
FIG. 3 is a block diagram of a mainframe in accordance with one aspect of the present invention.

With reference to FIG. 3, a block diagram of MAINFRAME 40 in accordance with one aspect of the invention is shown. MAINFRAME 40 preferably includes an MVS system that contains a hierarchical database management system (IMS) 41, a relational database management system (DB2) 42, index sequential access files (VSAM) 43, a transaction processing monitor (CICS) 44 and other datasources. Mainframe 40 also preferably includes a security and authentication system (ACF2) 45 and communication software (SNA) 46. Mainframe 40 also suitably includes custom and other vendor supplied software and databases. For example, custom development software includes Client Account Management System (CAMS) which includes processes to identify account ownership and creating new customers.

Figure 4:
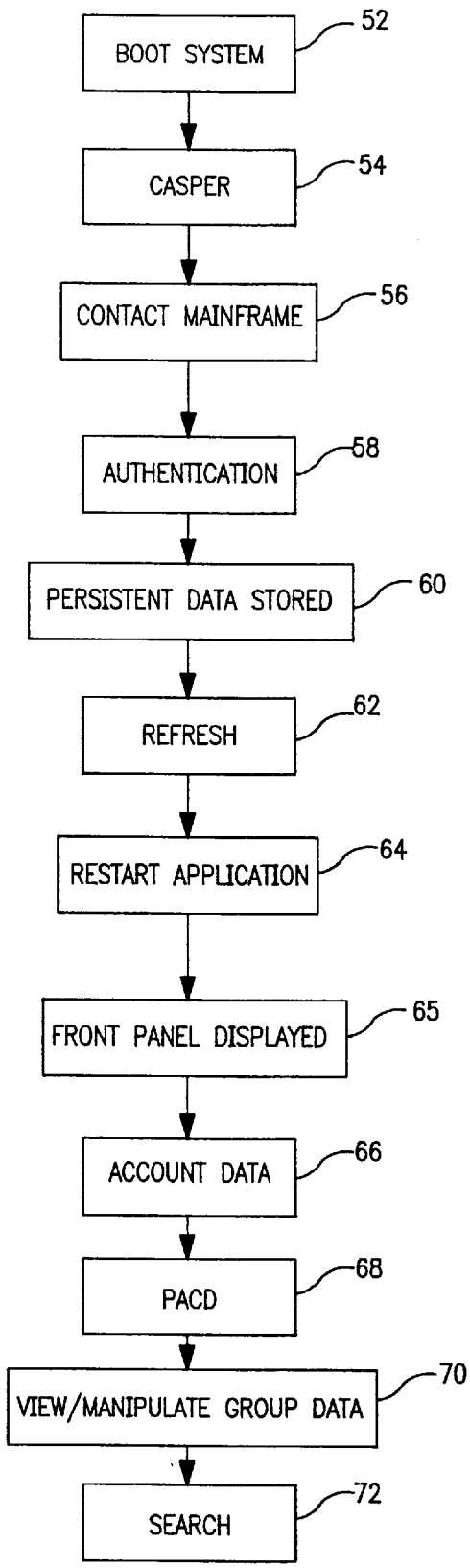
FIG. 4 is an exemplary flow diagram that illustrates an exemplary interaction between an advisor and a group management system in accordance with one aspect of the preferred invention.

With reference to FIG. 4, the general operation of system 5, in a preferred embodiment, begins with an advisor suitably BOOTing system 5 (step 52). As used herein, an "advisor" is the person who operates DESKTOP 10. Those skilled in the art will appreciate that an advisor includes anything capable of operating DESKTOP 10, such as a person, group of people, an employee, another computer or the like. Those skilled in the art will also appreciate that the operation outline of FIG. 4 is exemplary and an advisor can perform any of the functions/steps in any order.

Figure 4A:
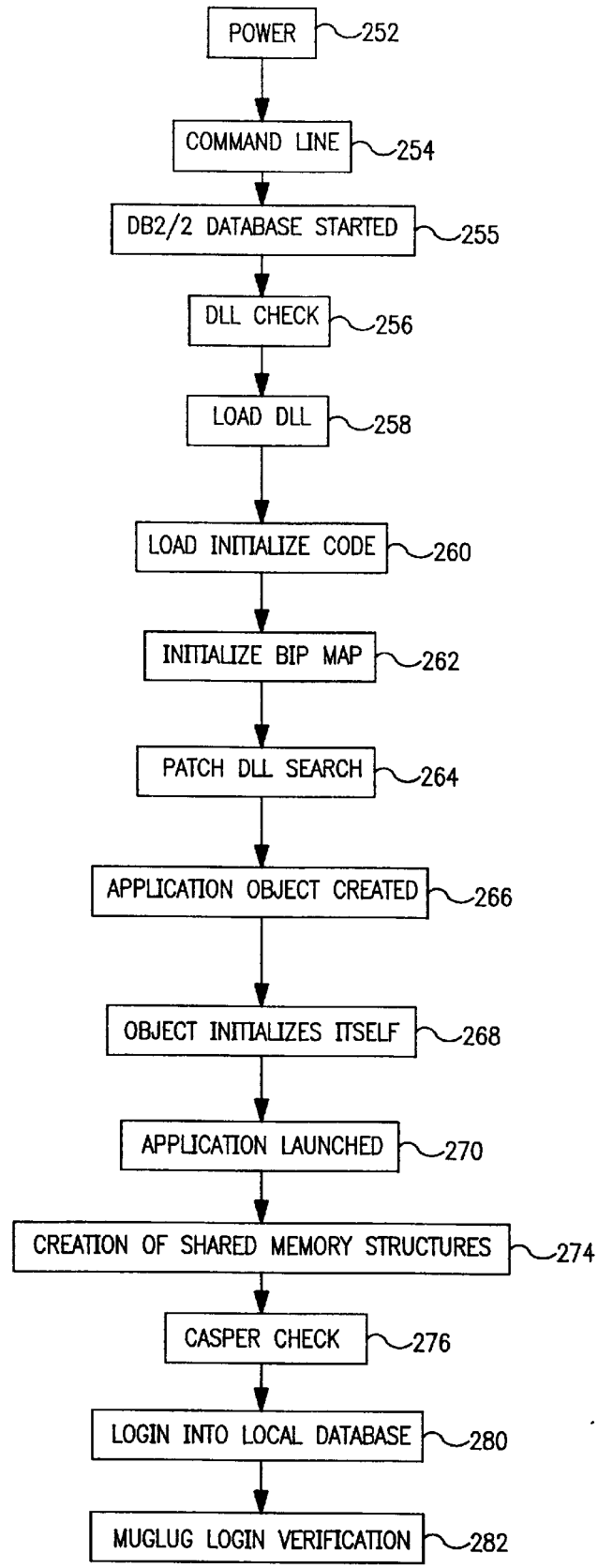
FIG. 4a–4b is an exemplary flow diagram that illustrates an exemplary booting up routine in accordance with one aspect of the present invention.
Figure 4B:
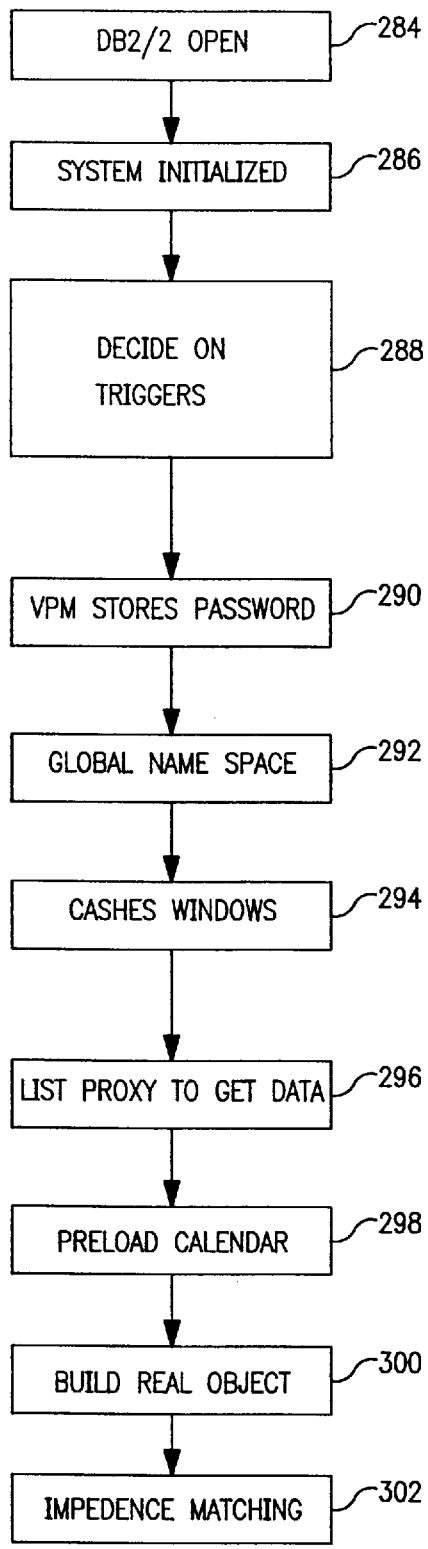

More particularly, an exemplary boot-up routine 52 is illustrated in FIG. 4a. The boot-up routine initializes a computer system by clearing memory and reloading an operating system. In a prefered embodiment, after suitably supplying DESKTOP 10 with power (step 252), a command line suitably appears on desktop user interface (step 254). DB2/2 DATABASE 22, which is a traditional bi-directional relational DATABASE, is preferably started (step 255). A commonly known command called START DBM is preferably used to start DB2/2 DATABASE 22. If any DYNAMIC LINK LIBRARIES (DLL) exist in a command line (step 256), DLLs are suitably loaded into APPLICATION 18 (step 258). Digitalk provides DLL packages, but the present invention patches new executed code into APPLICATION 18. An initiation code is preferably responsible for launching APPLICATION 18, so the initiation code associated with a DLL is also suitably loaded into APPLICATION 18 (step 260). BIT map dictionaries are suitably initialized (step 262), thereby allowing APPLICATION 18 to display BIT maps at a later time. APPLICATION 18 preferably looks for PATCH DLL (step 264), if any, that should be loaded at start-up. If no DLLs exist in the command line, no PATCHES are incorporated into APPLICATION 18. APPLICATION 18 creates a new application OBJECT (step 266) which suitably initializes itself (step 268) and APPLICATION 18 suitably launches an application (step 270).

Start-up preferably occurs in an INTERPROCESS COMMUNICATION SECTION such that communication between an OS2 WORKPLACE SHELL and APPLICATION 18 suitably occur. A WORKPLACE SHELL is a graphical user interface, supplied by an LS2, that is used to manipulate files and icons. In a prefered embodiment, a WORKPLACE SHELL is suitably customized so that it interacts with other processes. Upon starting APPLICATION 18, numerous shared memory structures are suitably created (step 274) and are used for an INTERPROCESS COMMUNICATION SECTION.

After a CASPER check is suitably completed (step 276), as more fully described below, APPLICATION 18 requests a USER NAME and USER PASSWORD for logging into DB2/2 DATABASE 22 (step 280). A login is suitably verified (step 282) by a standard IBM desktop verification program MUGLIB. Once a login is verified, DB2/2 DATABASE 22 is preferably opened (step 284) and APPLICATION 18 is suitably initialized with a current application (step 286).

With continued reference to FIG. 4a, after starting APPLICATION 18, an advisor preferably decides if a TRIGGERS 365 function (step 288), as explained more fully below, should be executed. Running TRIGGERS 365 adds a minute to a startup of the application. TRIGGERS 365 is preferably run when an advisor has extra time and needs to create pending TRIGGERS 365/CALENDAR 86 events.

OBJECTS are suitably restored from DATABASE MANAGER 21 on demand. The USER PROFILE MANAGER (UPM) feature of the DATABASE MANAGER preferably stores the actual USER ID as a password, along with the password (step 290). In a prefered embodiment, APPLICATION 18 includes a GLOBAL NAME SPACE to differentiate two identical names in MAINFRAME 40 (step 292). Preferably, each DESKTOP 10 is sequentially supplied with a unique number range, such that GLOBAL NAME SPACE suitably assigns a unique identification number to each individual. Thus, if two advisors enter the same client name, the clients will automatically be assigned different identification numbers because both DESKTOPs 10 have unique sets of identification numbers. Thus, upon entry of different demographic information into DATABASE 22 of the two names, the GLOBAL NAME SPACE feature will recognize that the information is describing two unique clients.

To initialize the data structures so they are quickly available for an advisor, window management APPLICATION 18 preferably CACHES other sets of windows (step 294). A window is a region of a coordinate system that is visible as the display image. CACHING includes opening other sets of windows in the background, but not presenting the windows to an advisor, thereby expediting the time needed to retrieve the windows when needed. In a prefered embodiment, Window Management APPLICATION 18 stores the windows in CLASS VARIABLES. In an alternative embodiment, the windows are not cached during start-up, but the windows are suitably cached after an advisor first views the window during that session.

With continued reference to FIG. 4a, APPLICATION 18 preferably utilizes a LIST PROXY to obtain simple demographic data from DB2/2 DATABASE 22 for all of the CLIENTS, PROSPECTS AND GROUPS and all of the parties assigned to each GROUP (step 296). All of this data is preferably arranged in temporary OBJECT 12. At the same time, in a prefered embodiment, APPLICATION 18 suitably preloads CALENDAR 86, as more fully explained below, with two months of activity information (step 298). An OBJECT preferably obtains a particular KEY VALUE from LIST PROXY, reads DB2/2 DATABASE 22 by rows and builds a real OBJECT from DB2/2 DATABASE 22 information (step 300). The BROKER LAYER preferably conducts impedance matching between OBJECT model and the relational data model so that the correct OBJECTS get brought in from DB2/2 DATABASE 22 at the correct time (step 302).

More particularly, with reference to FIG. 4, CASPER is started the first time an advisor attempts to use the product and every 60 days or 65 times thereafter. CASPER's purpose is to validate that an advisor still has access to use the system. CASPER operates by using encrypted information on the workstation. When invoked, CASPER uses data utility 32 to connect to MAINFRAME 40. MAINFRAME 40 access is verified with ACF2 45. Subsequently further access permission checks are performed.

With reference to FIG. 4, the CASPER utility suitably recognizes that an advisor is not valid (step 54), then, using data utility MIDDLEWARE 32, CASPER contacts MAINFRAME 40 (step 56) to validate an advisor's use of system 5. If validation is authenticated by MAINFRAME 40 (step 58), various persistent data is stored (step 60) to reflect the validation for a specific period of time or number of uses. Assuming verification of an advisor's use of DESKTOP 10, the encrypted information is updated to reflect the user's validation for the next 60 days or 65 uses. The CASPER utility is designed such that simple backup and restore operations cannot bypass the CASPER security checks. As discussed, with each use, the encrypted information is updated such that the count of actual uses of APPLICATION 18 is preferably maintained. The CASPER facility is preferably invoked quietly, without advisor interaction during GROUP 95 or GLOBAL 97 REFRESHES, so that advisors do not have to run the facility separately if they follow normal business procedures.

Figure 5:
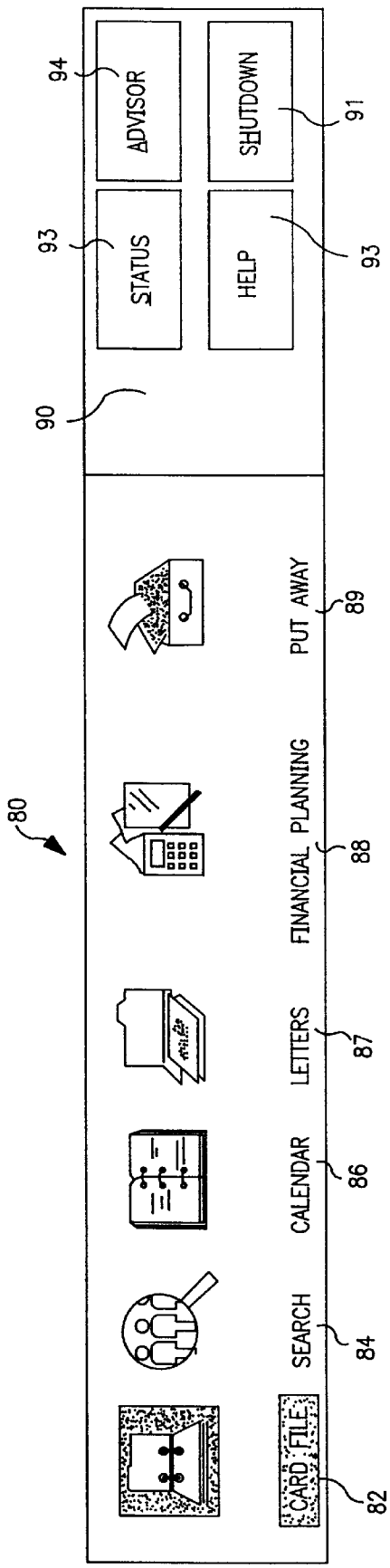
FIG. 5 is an exemplary screen view of a FRONT PANEL in accordance with one aspect of the present invention.

With reference to FIG. 4, an advisor typically requests a download either for all parties in DB2/2 DATABASE 22 (GLOBAL REFRESH 97) or for one or more parties (GROUP REFRESH 95) (step 62). To conduct a GLOBAL REFRESH 97, an advisor requests an update of his complete PERSON and ORGANIZATION lists. With reference to FIG. 1, using DU 32, an advisor requests that his client base to be extracted from MF 40. MF 40 extracts and captures data from the host databases which preferably include IMS 41, DB2 42 and VSAM 43. In a preferred embodiment, after 15 seconds, batch processes running on MF 40 will extract the data and copy the data to staging server 34. With reference to FIG. 5, in a preferred embodiment, the next morning, an advisor requests the status of his request from STATUS 92 on FRONT PANEL 80. With reference to FIG. 6a, a STATUS 93 view is displayed which preferably includes information related to Action 112, Request Type 113, Description 114, Date/Time 115, User 116 and Status 117. Pending completion of the request, an advisor requests a download to his local DESKTOP 10. Utilizing DU 32, FTP, DATA replicate and DATA populate, the data is transferred to DESKTOP 10 in TEMPORARY FILE 12 and inserted into DB2/2 DATABASE 22 by DATA EXTRACT 23 of an advisor. APPLICATION 18 is suitably restarted (step 64) to give an advisor access to the downloaded data. In a preferred embodiment, the entire process of a GLOBAL REFRESH 97 takes approximately 20–40 minutes.

With momentary reference to FIG. 4, upon restarting APPLICATION 18, a FRONT PANEL 80 is suitably displayed (step 65). With reference to FIG. 5, an exemplary FRONT PANEL 80 is illustrated. In a preferred embodiment, each icon suitably represents a specific feature of APPLICATION 18. FRONT PANEL 80 suitably includes six icons (CARD FILE 82, SEARCH 84, CALENDAR 86, LETTERS 87, FINANCIAL 88 and PUT AWAY 89), a PARKING LOT 90, and 4 buttons (SHUTDOWN 91, STATUS 92, HELP 93, and Advisor 94). FRONT PANEL 80 is always available and accessible, even when multiple windows and/or applications are open, thus providing quick access to target icons.

GLOBAL REFRESH 97 is started from the search VIEW or the search icon, as more fully explained below. The request VIEW is then displayed. If remote, an advisor is preferentially logged into MAINFRAME 40. In an alternative embodiment, GROUP REFRESH 95 is started from the search VIEW or on the GROUP icon, as more fully explained below. The status of the REFRESH is checked by selecting the status button 92 on FRONT PANEL, as more fully explained below.

In a preferred embodiment, REFRESH operates in conjunction with numerous existing APPLICATION 18 programs. REFRESH suitably comprises any APPLICATION 18 program capable of providing a connection to a MAINFRAME 40, incorporating the data into DB2/2 DATABASE 22 and incorporating DB2/2 DATABASE 22 information into APPLICATION 18. The exemplary APPLICATION 18 programs in accordance with a preferred embodiment of the present invention preferably include SHIVA PW SYNC v2.2 which allows connection to MAINFRAME 40 and its use for this purpose is generally known. FAST DB v2.4 operates the REFRESH function 95, 97 and brings the data to the PC from MAINFRAME 40 and its use for this purpose is generally known. DATA REPLICATE and DATA POPULATE v2.4 incorporates the data into DB2/2 DATABASE 22 and its use for this purpose is generally known. ACT! (Data Conv. v2.3.2) is a general purpose client tracking APPLICATION 18 that allows DATABASE information to be inputted directly into APPLICATION 18 and its use for this purpose is generally known. METROPOLIS (Data Conv. v. 2.2 to 2.3) is another data conversion tool to allow DATABASE information to be inputted directly into APPLICATION 18 and its use for this purpose is generally known. DOCKING UTILITY v2.2 allows a think pad to hook into a docking station and its use for this purpose is generally known.

Figure 6:
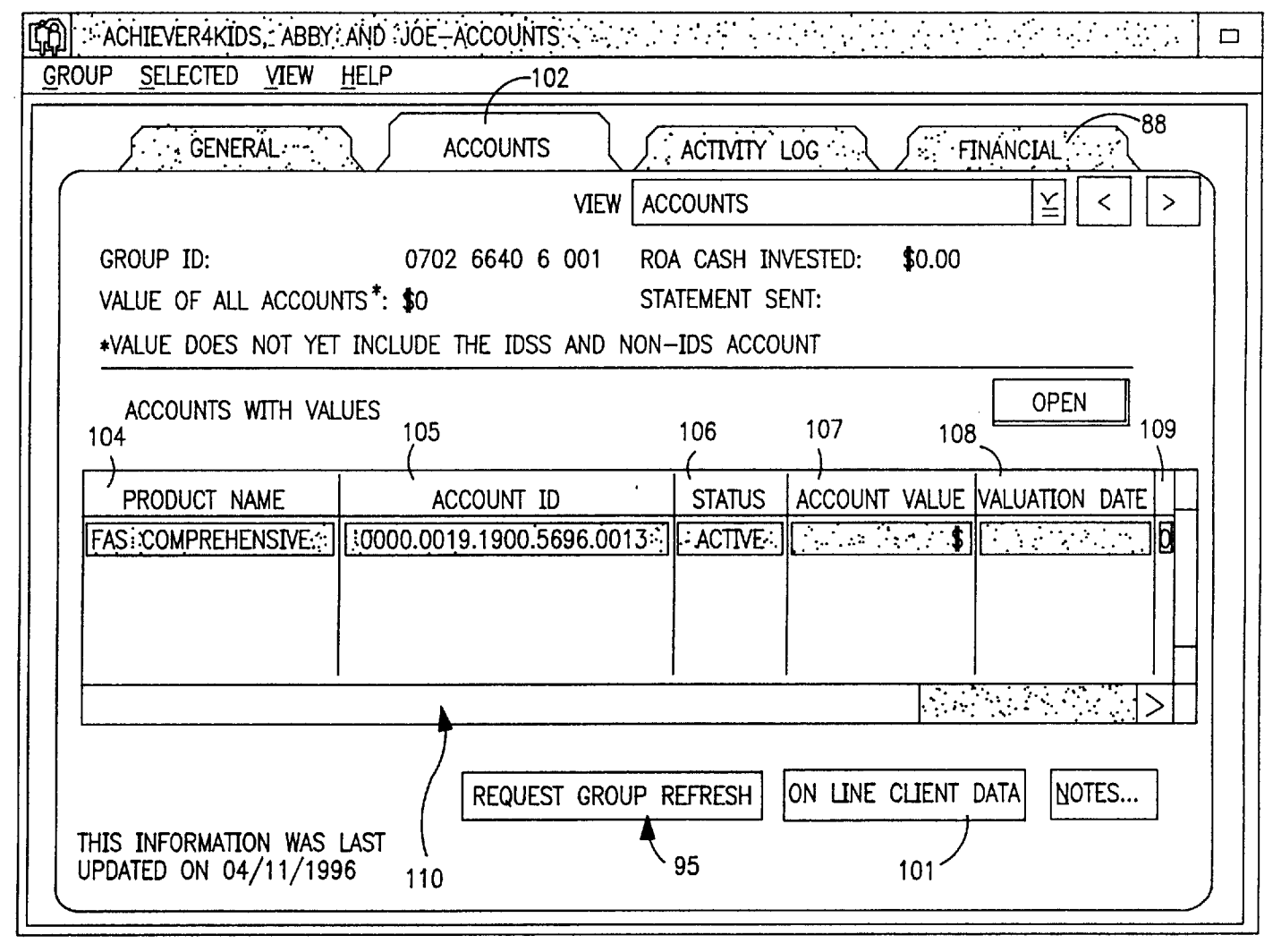

With momentary reference to FIG. 4, in a preferred embodiment, an advisor next looks for account data (step 66) for a particular CLIENT GROUP, as more fully explained below, by suitably opening the group and suitably switching to account tab 102, as seen in FIG. 6. Those skilled in the art will appreciate that a "tab" is a visual folder representation of a particular grouping of information or functionality of data from APPLICATION 18. An advisor is preferably presented with a list of accounts for the GROUP. Details of the account, such as account service history, servicing advisor, valuation, etc., are available by selecting various accounts and requesting specific detail. This data is brought in from DB2/2 DATABASE 22 which was populated by the GROUP or GLOBAL REFRESH 97 process (step 62 of FIG. 4). The date the information was last updated from MAINFRAME 40 is displayed in red at the bottom of ACCOUNTS TAB 22 to indicate if the data is up-to-date. With reference to FIG. 6, GROUP REFRESH 95, ON-LINE CLIENT DATA and FIELD DATA CAPTURE are also accessible from ACCOUNTS TAB 102.

With continued reference to FIG. 4, an advisor chooses to execute the ON-LINE CLIENT DATA (OLCD) application (step 68). PACD preferably includes OLCD and the ACCOUNT TAB 102. With reference to FIG. 6, OLCD 101 uses Remote Procedure Calls (RPCs) as defined by DU 32. DU 32 dispatches the RPCs to the appropriate data server, which provides data for processing. The data server answers back the result data from the RPCs. Typically, the data server is provided by CICS 44 transaction on MAINFRAME 40. If necessary, DU 32 transforms the data to conform to the tabular data stream format expected by OLCD 101 application. OLCD 101 then formats and displays the information for an advisor, thereby providing up-to-date MAINFRAME 40 account data is provided to an advisor. In a preferred embodiment, the information is current as of close of previous business day.

OLCD 101 allows an advisor to access real-time information about a specific account for a client from MAINFRAME 40. In the preferred embodiment, the information is accessible within 10 seconds or less to enable reactive service queries. Thus, while an advisor is talking on the phone with the client, he can obtain answers to the clients questions.

Viewing OLCD 101 requires a real-time connection to DATABASE 22, so an advisor's computer becomes a terminal for viewing MAINFRAME 40 information. An advisor can choose to download MAINFRAME 40 information to DESKTOP 10 using the GLOBAL OR GROUP REFRESH 95 feature (see step 62 in FIG. 4). An advisor accesses OLCD 101 for a GROUP either through CARD FILE 82, as more fully explained below, or through Accounts tab 102 in the GROUP VIEW. From the front of CARD FILE 82, if a client is selected, then OLCD 101 button will be activated. By selecting this button, the client GROUP selected will be viewed in OLCD 101 software in MAINFRAME 40. An advisor on LAN 26 simply needs to select OLCD 101 button to produce OLCD 101 application. In an alternative embodiment, advisors who are remote will need to first establish a connection via a modem. With reference to FIG. 6, OLCD 101 VIEW lists all the products 104, all the account ID's 105, the status of each product 106, the account value of each product 107, the valuation date of each product 108 and the account opened date of each product 109 in a scroll-able box 110. The account values will be the last recorded value on MAINFRAME 40. The products listed in the product box are sorted by product name 104, account ID 105, status 106, account value 107, valuation date 108 or account open date 109. Each of these sort options are sorted in an ascending or descending order. The WINDOW feature lists all the open windows of OLCD 101, giving an advisor quick recall of any single open window, and the ability to close all windows.

With continued reference to FIG. 6, in the pull down menu, OLCD 101 window includes File, Sort, Window and HELP. The File pull down menu includes Open, which will open the Open OLCD 101 at the VIEW; Close, which will close the GROUP window; Change Password, which will allow an advisor to change his password on APPLICATION 18; Print and Exit. The difference between Close and Exit is that Close simply closes the window, but keeps an advisor logged onto OLCD 101 application. Exit logs an advisor out of OLCD 101.

Informational points about this CLIENT GROUP include the type of GROUP (e.g. household), the GROUP ID number, how many PERSONs there are in this GROUP, the total number of accounts in this GROUP, the CDSD (contingent deferred sales charge) cash invested (the loadbase for rear-end loaded accounts), ROA cash invested (rights of accumulation which is the load-base on front-end loaded products) and Statement Sent Date which is the last consolidated statement sent to this CLIENT GROUP.

A pull-down box includes Accounts, Accounts with Values, clients, Advisors and Shares. The Accounts with Values is the default VIEW. The Accounts VIEW shows all products with the account ID, status, account close date, the on status, the consolidated statement, and an indication whether an account is in a retirement plan. CLIENT shows the individual clients assigned to this GROUP with CLIENT ID, the role of the client in the GROUP (e.g. member), the date of birth of each client and the tax payer ID number of each client. Advisor shows all an advisor roles for this client GROUP, with advisor name, advisor ID number, division office number and the role, e.g. advisor, DVP. Shares lists all products that are measured in number of shares by name, number of shares owned and last known share price.

To open a specific account in the account list box, there are two options: single click, highlight and press the open button or double dick on the account. Opening any account will produce a specific VIEW of that account. From the original OLCD 101 GROUP VIEW the File Open command will produce OLCD 101 open VIEW. Each account class, e.g. funds, annuity, etc., will have different sorting options and different choices in the pull down select box.

The open VIEW of OLCD 101 allows for searching on MAINFRAME 40 for a specific client by name, taxpayer ID number, CLIENT ID number, account number, or GROUP ID number. If an advisor has security clearance to access a specific client, then an advisor will be able to open OLCD 101 GROUP VIEW on that client.

Next, with momentary reference to FIG. 4, an advisor preferably views and manipulates GROUP data in DATABASE 22. The grouping of clients by specific criteria greatly enhances an advisor's ability to assist clients in achieving their relationship goals. Many products are marketed to certain segments of society and having a GROUP mechanism to facilitate this marketing effort would greatly assist the marketing efforts. To conduct a proper analysis of each group, an advisor typically needs large amounts of information. In the present invention, the large amounts of group information is suitably organized in DATABASE 22, such that DATABASE 22 quickly and efficiently supplies an advisor with needed information.

An advisor interacts with many parties and each of the involved parties have a unique role in the group management system. In a preferred embodiment, a party is either be a PERSON, an ORGANIZATION or OTHER. A PERSON is defined as any person known to an advisor or to an advisor's corporation. Each person is assigned a CLIENT ID and may have a unique role or relationship with other PERSONS. For example, PERSON1 may be a mother and PERSON2 may be a daughter, therefore, PERSON1 and PERSON2 have a mother/daughter relationship. In a preferred embodiment, an ORGANIZATION is defined as a business or pension (ENTITY types, as more fully explained below). An ORGANIZATION preferably includes a small business, a corporation, a C-corp, an S-corp, a Not-for-Profit, a sole proprietorship or the like. In a preferred embodiment, the business is limited to any business with less than 100 employees and less than $2 M in sales. Each ORGANIZATION is assigned a CLIENT ID, and in an alternative embodiment, has a unique relationship with other ORGANIZATIONS. In a preferred embodiment, every contact classified as a PERSON or ORGANIZATION is preferably in a GROUP; however, contacts classified as OTHER do not need to be in a GROUP.

In a preferred embodiment, for an advisor to provide efficient customer service, these parties are organized into GROUPs. Grouping the parties allows an advisor to avoid sending duplicate correspondence to related people or organizations. To improve the speed of the system, grouping also eliminates duplicate address fields in the database. Furthermore, the grouping of parties allows an advisor to respond to special requests from individual parties. For example, after two people go through a divorce, each of the people typically request separate statements to be sent to separate addresses. The grouping of clients, along with relationship fields, allows an advisor to efficiently respond to this request.

In a preferred embodiment, the GROUPs, which contain all of the PERSONs and/or ORGANIZATIONs, include CLIENT GROUPS and PROSPECT GROUPS. Depending on the status of the PERSON or ORGANIZATION, the party is grouped as a client and assigned a GROUP ID. A prospect is defined as any PERSON or ORGANIZATION that has not contracted with an advisor to preform services. The client and PROSPECT GROUPS may include households, organizations or special groupings. Examples of a client GROUP include a husband and wife, mother and daughter, an entire family, an entire household, etc. In a preferred embodiment, a household is defined as a minimum of one PERSON. Examples of ORGANIZATIONAL GROUPS include numerous members of a single pension plan. An example of special groups include a custodial relationship whereby a father reviews a son's transactions or a cluster of mutual funds.

In a preferred embodiment, the persistent portion of APPLICATION 18 object model preferably includes a corresponding, isomorphic representation within DATABASE 22. To facilitate the isomorhic mapping between APPLICATION 18 object model and the local database, a persistence framework was built. The persistence framework handles the necessary persistence activities as well as the impedence matching between APPLICATION 18 object model and a preferred set of tables and keys within DATABASE 22. Thus, the grouping relationships are exemplified in DATABASE 22 table and key structures as well as APPLICATION 18 object model.

Figure 7:
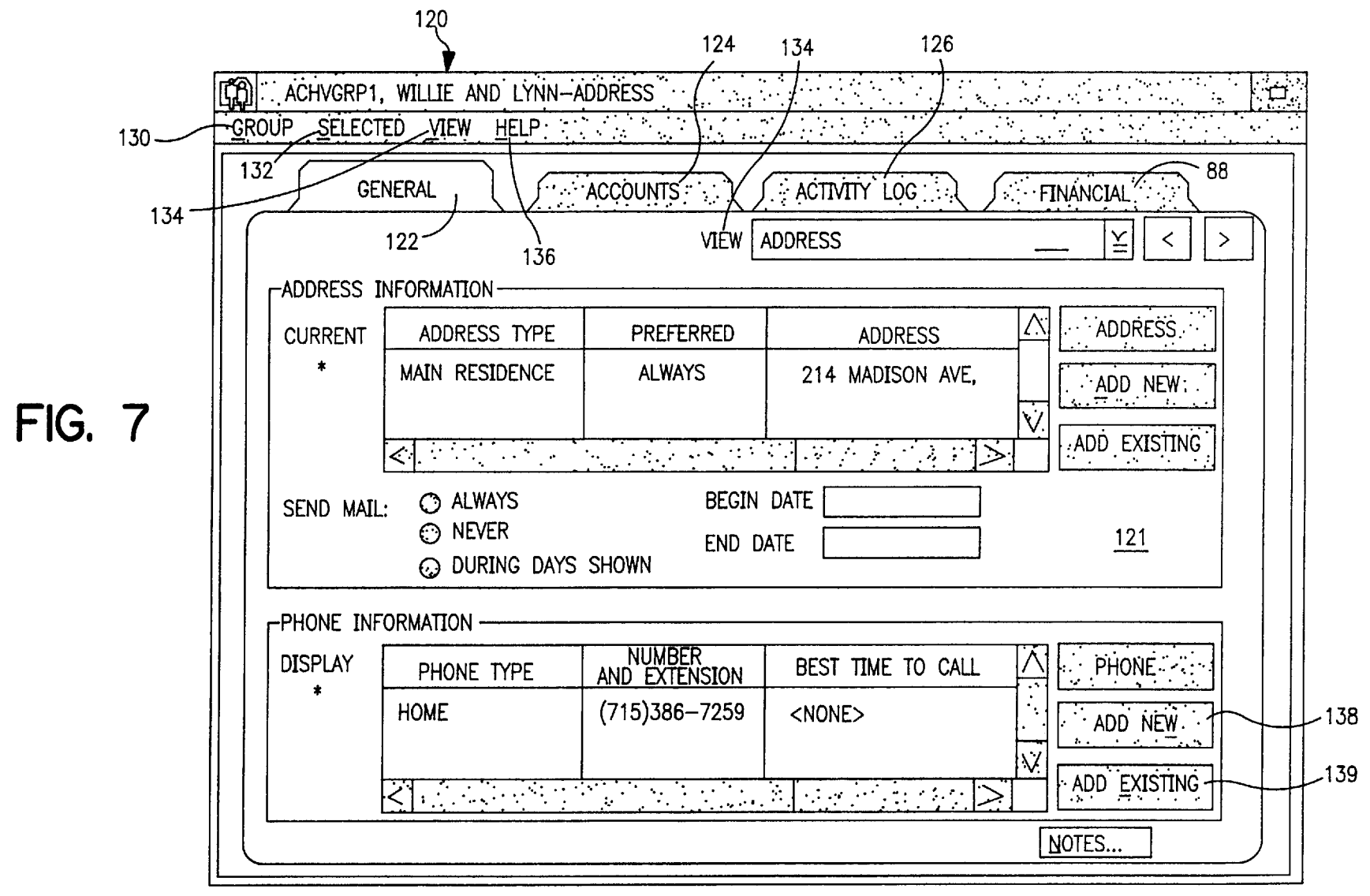

By selecting a name in the name list box of CARD FILE 82, as more fully explained below, an advisor opens the GROUP associated with that PERSON or ORGANIZATION. With reference to FIG. 7, a GROUP folder 120 includes the tasks of GENERAL 120, ACCOUNTS 124, ACTIVITY LOG 126 AND FINANCIAL SUMMARY 88 and the menu choices of GROUP 130, SELECTED 132, View and HELP 136. The preferred functions of the menu choices of GROUP 130, SELECTED 132, View and HELP 136 are similar for all folders within the present invention. Thus, for simplicity and clarity, the following functional explanations for each menu choice shall apply to the menu choices in other folders, except where the functionality of a menu choice is redefined or supplemented herein. Furthermore, although the tasks and menu items are shown with reference to FIG. 7, for simplicity, the contents of each task and menu item will be described below without being specifically displayed in FIG. 7.

With reference to FIG. 7, an ADDRESS View of the General tab (accessed through CARD FILE 82) is shown. Within Address Information Box 121, an Advisor preferably enters one or more ADDRESSes for a contact. An advisor chooses and enters the type of ADDRESS (main residence, second residence, business, etc). An advisor also indicates which members of the GROUP to which the ADDRESS applies (Apply ADDRESS), thereby entering the ADDRESS only once and attaching to it all appropriate contacts. An advisor indicates whether mail should be sent to the ADDRESS (always, never, during dates shown). If an advisor chooses "during dates shown," he or she can set a begin and end date for the ADDRESS (e.g., for a second residence). An advisor also enters directions on how to get to the ADDRESS.

The benefit of the ADDRESS management feature is that an advisor does not have to be concerned about whether mail will reach the contact if the contact has more than one ADDRESS. The ADDRESS MANAGEMENT feature ensures that a letter will be sent to the location where the contact resides at any time during the year. The current ADDRESS also appears in CARD FILE 82.

With continued reference to FIG. 7, GROUP MENU 130 List preferably includes New GROUP which opens a new GROUP, New PROSPECT which opens up a new PROSPECT information window, Print which prints a selected report on that GROUP, On-line Data which performs the same action as the similar button on CARD FILE 82 and Close which closes the window. GROUP REFRESH 95 under the GROUP MENU 130, as explained above, requests an update of the client account information and other corporate office controlled fields. Requesting GROUP REFRESH 95 sends a request to MAINFRAME 40 which is suitably fulfilled and then REFRESH 95 is suitably retrieved by an advisor by selecting status button 92 on FRONT PANEL 80 (see FIG. 5), as more fully explained below. NEW NOTE under GROUP MENU 130 displays the New Note window. New Note allows an advisor to quickly write a note about this GROUP. The note can be tagged as Sensitive, and is automatically time stamped and placed in the activity log when an advisor saves a note.

SELECTED MENU 132 preferably includes OPEN which contains a Member and EXTERNAL ADVISOR 490 option. The OPEN option is only activated upon selection of a person/INDIVIDUAL. NEW creates a new PERSON, ORGANIZATION or EXTERNAL ADVISOR 490 for the GROUP. ADD EXISTING brings a PERSON, advisor or ORGANIZATION into the GROUP that already exists on the data base. DISASSOCIATE disconnects a member EXTERNAL ADVISOR 490 from the GROUP and will disconnect an address of phone number from the GROUP. The Disassociate options are activated only when the member, EXTERNAL ADVISOR 490, address or phone number is highlighted.

The VIEW MENU 134 preferably includes PREFERENCES, GENERAL, ACCOUNTS, ACTIVITY LOG and FINANCIAL. The GROUP PREFERENCES preferably include GROUP Member View section for declaring the salutation preference which contains a pull-down list with pre-set choices and an option for declaring female or male name first in the salutation. The Address View preference suitably sets the default city and state of GROUPs until this is overwritten by an advisor. The Phone View preference declares the phone type, e.g. home/work, that is the default phone number that will be shown on CARD FILE 82 and phone to-do's. The GENERAL, ACCOUNTS and ACTIVITY LOG choices perform similar functions as the similarly named tabs across the top of the file folder.

With continued reference to FIG. 7, GENERAL TAB 122 preferably includes GROUP Membership (which is the first and default page in a prefered embodiment), Address (as shown in the embodiment of FIG. 7), Service, EXTERNAL ADVISOR 490, and Marketing. An advisor preferably navigates between these five choices either by suitably paging up and down via two arrows on the file folder or via the pull down bar. The information on this View preferably includes name, CLIENT ID number, tax ID number, relationship type (entity type or relationship to the first member) client type, and date of birth.

In GENERAL TAB 122, an Open button is activated when one of the members has been selected. An Add Existing button 139 suitably allows an advisor to add a member to this GROUP that is currently elsewhere on DATABASE 22, e.g. in another GROUP. Selecting this button will bring up the PERSON/ORGANIZATION Search 84 VIEW. The PERSON/ORGANIZATION Search 84

VIEW, as more fully explained below, allows an advisor to quickly find a PERSON or an ORGANIZATION. Two buttons, PERSON and ORGANIZATION, allow an advisor to narrow the search down to one of those two categories. An advisor then either types or scrolls to find and select the PERSON/ORGANIZATION they want to add to this GROUP. The New PERSON button brings up the PERSON View to add a new PERSON to this GROUP, e.g. not currently in the data base. PERSON View includes PERSON, SELECTED, View and HELP. PERSON View includes New PERSON which brings up another PERSON View.

OPEN PROFESSIONAL DESIGNATIONS suitably brings up a PROFESSIONAL DESIGNATION View, which allows selection of the PROFESSIONAL DESIGNATION of the PERSON, e.g. CFP. PROFESSIONAL DESIGNATIONS View preferably includes a scroll box of pre-selected titles. An advisor can create new professional designations that are not in the list box by selecting the OTHER check box and typing in the new title. The third choice under PERSON menu is Close, which closes the PERSON View.

With continued reference to FIG. 7, SELECTED MENU 132 preferably includes Open, New Relationship, Add Existing Relationship, New Job, Delete Job, Delete Address, Delete Phone Number, and Delete Relationship. New Relationship passes through relationship View for a PERSON and opens up a new PERSON. Upon completion of an entry, exiting PERSON View preferably switches an advisor to relationship View. The New PERSON is highlighted and the relationship information can then be established. Add Existing Relationship preferably takes an advisor to relationship View and preferably opens the PERSON search wherein an advisor can establish an existing PERSON with a relationship. New Job preferably passes through the employment summary to employer information View. After inputting the data, Save/Return takes an advisor back to employment summary View.

The Delete Job button suitably becomes active when the job is selected in employment summary View. Upon selecting Delete Job, the job is preferably deleted and no message dialog box appears. Delete address becomes active when an address is selected from address View. If the address is in multiple GROUPs or PERSONs, the Delete Address Function will inform an advisor of the multiple locations. An advisor is able to select All or select any GROUP, ORGANIZATION or PERSON, and then select Continues and the address is suitably deleted. Delete phone number suitably becomes active when a phone number is selected from address View. If the phone number is in multiple GROUPs or PERSONs, the Delete Phone Number Function will preferably inform an advisor of the multiple locations. In a prefered embodiment, an advisor can suitably select All or select any individual, GROUP or PERSON, and then select continue and the phone number is suitably deleted. Delete Relationship becomes active when the relationship is selected from relationship View, but no message dialog box appears.

With continued reference to FIG. 7, View menu preferably includes General, Address, Health info, Relationships, Employment summary, user defined attributes and Preferences. Upon selecting preferences, Preference View opens. PREFERENCE View preferably includes State of residence, Salutation, Set user-defined fields, Save and Cancel. State of residence is preferably a pull down list of alphabetical states that are first letter sensitive for selection. Salutation is a pull down list of First, First Last, Preferred, Preferred Last, Prefix First Last, Prefix First Middle Last Suffix, and Prefix Last. In a prefered embodiment, the default is Preferred, which selects the PERSON's preferred name as the salutation. For example, Thomas Smith's preferred salutation could be Tom. An user-defined fields are preferably free-form text which an advisor can add such items as sports, hobbies, etc. Save will suitably store the information and return an advisor to whatever View an advisor came from in the PERSON. Cancel will not store, but will preferably return an advisor to previous View.

General View is preferably used to capture key PERSON information, such as name and gender. The prefix has a pull down menu of exemplary key prefixes including Dr., Miss., Mr., Mrs., Ms., None or the ability to type in a 10-character name for military title or other types of prefixes. Suffix includes II, III, Jr., Sr., None and free text up to 10 characters. Preferred name is suitably generated from the first name, if none is selected. Gender is preferably a pull down list of male, female or unknown. Professional designation preferably includes a multi-selected list of titles. If the title is not present, an advisor can select OTHER for a personalized entry. Save suitably saves the selected information and Cancel will suitably not save the information.

Tax information preferably includes Tax ID number, Tax filing status and employment status. The Tax ID has an edit, whereby an advisor preferably enters 9 digits and APPLICATION 18 properly formats the entry. Tax filing status preferably includes head of household, married filing jointly, married filing separately, qualifying, widow(er), single and unknown. Employment status preferably includes Unknown, Other, Employed, Fully retired, Not employed, Retired working part time and Self-employed. Credit card information preferably includes CLIENT ID number and membership information. An advisor preferably enters 8 digits and APPLICATION 18 preferably adds 001 to the CLIENT ID, As an alternative embodiment, an advisor enters 11 digits.

The salutation preferably defaults to the selected salutation from the preference. If an advisor does not like the salutation, an advisor can preferably select a personalized salutation (e.g., a nickname like Skip). The mailing name is preferably the first line on the envelope and defaults to a preference setting which can be modified by an advisor. The date of birth is preferably inputted, or alternatively is loaded from APPLICATION 18. Marital status has an alphabetized list preferably including Divorced, Engaged, Married, Parted or Separated, Partner, Single, Unknown or Widowed.

PERSON Address View preferably includes address information and Phone information. Under Address information, a chart preferably shows current address information, including the Address Type and Preferred address. The buttons Change, Add new, and Add existing are also available. The Send Mail section preferably includes Always, Never, and During dates shown. Begin date and End date are also available. Add new address information preferably includes a default screen with the main residence as the Address Type. Address lines preferably include a field for zip code, city, state, county and country. State and County preferably have pull down menus. The Address type field preferably has a pull down menu which shows Main residence, Second residence, Work, Small business, organization and other as alternatives to the Main residence selection.

Each choice in Address View preferably offers 3 lines of address to be entered by an advisor. The zip code field preferably accepts either 5 or 9 digits, and the program preferably hyphenates the 9 digit code. City preferably defaults to the selected reference, or alternatively is overridden by typing in suitable free text. State is preferably a drop down list of all states, which is first letter sensitive. County is a pull down list of all counties for that particular state. Country preferably defaults to USA, but an advisor can enter another country.

Directions preferably allows an advisor to enter directions to a particular address. These directions will show up in the CALENDAR 86 when an advisor schedules an activity with the ORGANIZATION or PERSON. SAVE saves the directions and CANCEL does not, but both return an advisor to the previous screen. SEND MAIL TO THIS ADDRESS always is the type of residence which an advisor wants to pick as the primary mailing address for this PERSON. DURING DATE SHOWN is an indicator for snow birds who send 3 months at another location. Once this field is selected, an advisor can enter a begin date and end date, years not required, thereby allowing an advisor to always send a letter to the location where the PERSON or GROUP resides. The final selection is Never, which means that mail will never be sent to this address. The APPLY ADDRESS TO THE FOLLOWING section will pull up either the GROUP or the PERSON (s) that are associated with the GROUP. An advisor may select all or deselect all, or select individual PERSONs or GROUPs for which this address may apply.

The buttons in Address View preferably include Save/Return, Save/Add Another and Cancel. The Save/Return takes an advisor back to the previous screen. The Save/Add Another saves this information and brings up another Add Address screen. Cancel cancels the entry and returns an advisor to the previous screen.

In a prefered embodiment, under PERSON, to add an existing PERSON, an advisor selects ADD Existing and an address search dialog box, containing Address type Preferred and Address fields, appears. An advisor need only highlight the selected address and then save. This action adds the selection as an existing address. Cancel will cancel the action within the address View. If an advisor highlights one of the addresses, the Send Mail feature, as defined above, becomes active and a new Send mail preference can be selected. The Current "★" indicates the selected address for CARD FILE 82 LETTERS 87 and reports.

A chart under Phone information preferably displays the Phone type, Number and extension, and the Best time to call. Under Add new phone, ENTER A NEW PHONE NUMBER dialog box includes phone type, phone number, extension, Best time to call, and Apply phone number to the following. The Phone type includes Home, Work, Small Business, Fax (home), Fax (work), Car, Pager, Cellular, organization and other. The Phone Number and Extension is a free text entry field that has an edit for a minimum of 7 numbers, and allows for extensions. The Best Time to Call field is either a pull down list with Afternoon, Day, Evening, Morning, Other or None; or an advisor may input a message of your own (i.e., PM). The Apply phone number to the following field has the same action as described above for the Apply address to the following. The Save/Return, Save/Add Another and Cancel buttons are present, and function the same way as those described above. The action for Change a Phone number and Add Existing phone number are similar to those for Change an Existing Address and Add and Existing Address.

The three major boxes of information for each PERSON preferably include HEALTH INFORMATION, LIFE SPAN and SOCIAL INFORMATION. The Health Info View preferably includes Health information (e.g., health rating and smoker information), Life span information (date of birth, date of retirement, and date of death), and Social information (preferred language, citizenship status, and state and country of residence) about a PERSON. Under HEALTH INFORMATION, a health rating for life insurance includes Standard, Sub-standard, Uninsured and Unknown. SMOKER is a yes/no indicator with a quit date that can be applied to each PERSON. TRIGGERS 365 in APPLICATION 18 activates a to-do on the CALENDAR 86 for a PERSON when the PERSON hits the one-year anniversary of the quit date. TRIGGERS 365 permits an advisor to do pro-active servicing by offering the PERSONs reduced rates for insurance, e.g. non-smoker rates.

On the General PERSON View, an advisor preferably enters the PERSON's date of birth. APPLICATION 18 will then suitably calculate the PERSON's retirement date and displays it on the Health Info View. The PERSON's life expectancy will be suitably calculated based on Date of Birth, Health Information, and mortality tables. LIFE SPAN preferably includes date of birth which is a read only field, date of retirement which is calculated from date of birth, death indicator and date of death (once the death indicator is selected). SOCIAL INFORMATION allows an advisor to put in preferred language, date of residence, citizenship status and county of citizenship.

PERSON RELATIONSHIP preferably includes a grid with name, date of birth, tax ID#, relationship date, relationship type and three buttons including Open, New relationship, and Add Existing relationship. These functions are the same as those listed above. If an advisor highlights a PERSON, an advisor may select the Open button for more PERSON information. Relationship information is a predefined set of relationships used by financial planning. A reciprocal relationship will be established for the other party. In addition to blood relationships, some trustee type relationships, such as benefactor and owner are available. The relationship date includes anniversary date for marriage.

PERSON Employment summary preferably includes the occupation because PERSONS have multiple employers. Also included is employer, status, assistant's name, assistant's phone, Open and Add employer. If an advisor selects Add Employer, Employer Information is displayed which has address, phone, company name, and some employment information. The employment information section includes status, title, hire date, term date, term reason, assistant name and assistant's phone. The employment Status has fields that define whether the PERSON is full, part time, self-employed, temporary, terminated or unknown. The Term reason is not activated until the term date is input. Save/Return, Save/Add Another and Cancel function as described above. Save/Return and goes back to the Employment summary View. From the employment summary View, an advisor selects an employer or the open button and Employer information is opened again.

In a prefered embodiment, user-defined FIELDS are set up in Preference, so that an advisor may freely input any information. User-defined FIELDS exist in search engine 84 for better marketing.

With reference to FIG. 7, within GROUP General tab 122, the behavior of Address is preferably similar to PERSON. Service preferably includes client service agreement, client service APPLICATION 18, Inactive status information, Servicing advisor and Servicing dates.

Client service agreement is preferably the service agreement that is established between an advisor and client. The agreement includes the service begin date, duration and service end date. The service end date is a TRIGGERS 365 on the CALENDAR 86 for an advisor to renew the client service agreement. Using client service APPLICATION 18, the next consolidated statement date will be downloaded from MAINFRAME 40 and the service frequency will be defaulted annually. APPLICATION 18 suitably allows an advisor to schedule meetings, mailings and phone calls for the client base over the entire year.

TRIGGERS 365 are suitably activated when an advisor selects a new service frequency. The selection automatically sets-up the meeting and mailings and phone calls based on the consolidated statement date. TRIGGERS 365 are alternatively established by changing each of the types to the desired month. For Meetings, Mailings and Calls, an advisor can select a Change button which activates a dialog box called Change Service Months. An advisor selects a month by selecting the grey square in front of the month, and then Save at the bottom of the dialog box. The months are visible to the right of Meeting, Mailing and Calls. TRIGGERS 365 are automatically set-up on the CALENDAR 86 for the beginning of each of those months. TRIGGERS 365 indicate that an advisor needs to schedule the client service meeting, send a client service mailing, or conduct a client service call.

Under INACTIVE STATUS INFORMATION, an advisor preferably selects inactive, the date a CLIENT became inactive and the reason a CLIENT became inactive. This information is important because a CLIENT may no longer be sent to DESKTOP 10 in a REFRESH. SERVICING Advisor preferably includes the name of an advisor, advisor number and location and the prior servicing advisor. For an analysis of turning PROSPECTs into clients, an advisor preferably obtains SERVICING DATES, THE NEXT SERVICE MEETING, LAST SERVICE MEETING, BECAME client DATE (which is downloaded from MAINFRAME 40) and BECOME PROSPECT date.

GROUP EXTERNAL ADVISOR 490 preferably includes name, phone number, role, Authorized to View client information and Firm name. The buttons preferably include Open, Add existing and New EXTERNAL ADVISOR 490.

Under PERSON Search View, selecting Add existing displays PERSON SEARCH whereby an advisor can search by last name. An advisor can select an EXTERNAL ADVISOR 490 from the search list. Save and Cancel buttons preferably function as described above, but return the screen to the EXTERNAL ADVISOR 490 GRID.

Selecting new EXTERNAL ADVISOR 490 reveals the EXTERNAL ADVISOR 490 View. Opening Professional Designations opens that field on the panel. View and HELP are also available. The panel includes Prefix, First name, Middle name, Last name, Suffix, Preferred name, Gender and Professional designations. All work as previously described. New fields include EXTERNAL ADVISOR 490 role, Authorized to share information, Firm name, Assistant's name and Salutation.

Marketing information preferably includes client acquisition, Market information, Primary interest, Recommended by and Publications. Client acquisition is preferably a technique field with pre-defined items and a number field with 11 digits. Market information includes a pre-set set of market segments comprising Achiever, Mature, Non-segmented, Pre-retired, Small business owner. Target market is suitably a free-text entry field which an advisor enters such data as Golden Age Retirement Home. Primary interest is a free text field for notes about the interests of the GROUP. Recommended by includes Add PERSON and Remove. The Add PERSON brings up PERSON Search which allows an advisor to select a PERSON that recommended them. In a preferred embodiment, Publications and Tax and Business Service (TBS) are indicators that the GROUP is a member of TBS, receives a newsletter or publication.

All tabs preferably have a NOTES button whereby an advisor gets a New Note dialog box. NOTES is a free text entry box that also puts in a date and time for the note. NOTES also includes a Sensitivity indicator to protect sensitive notes about a GROUP, such as Former Alcoholic. If an advisor selects save, it puts a note in the activity log under notes. The Cancel button cancels the note.

ACCOUNT TAB 124 is similar to ON-LINE CLIENT DATA, but preferably has less account information and views. A red date that preferably reflects when the last refresh 95, 97 occurred. GROUP REFRESH 95 and ON-LINE CLIENT DATA have separate buttons available in ACCOUNT TAB.

Figure 14:
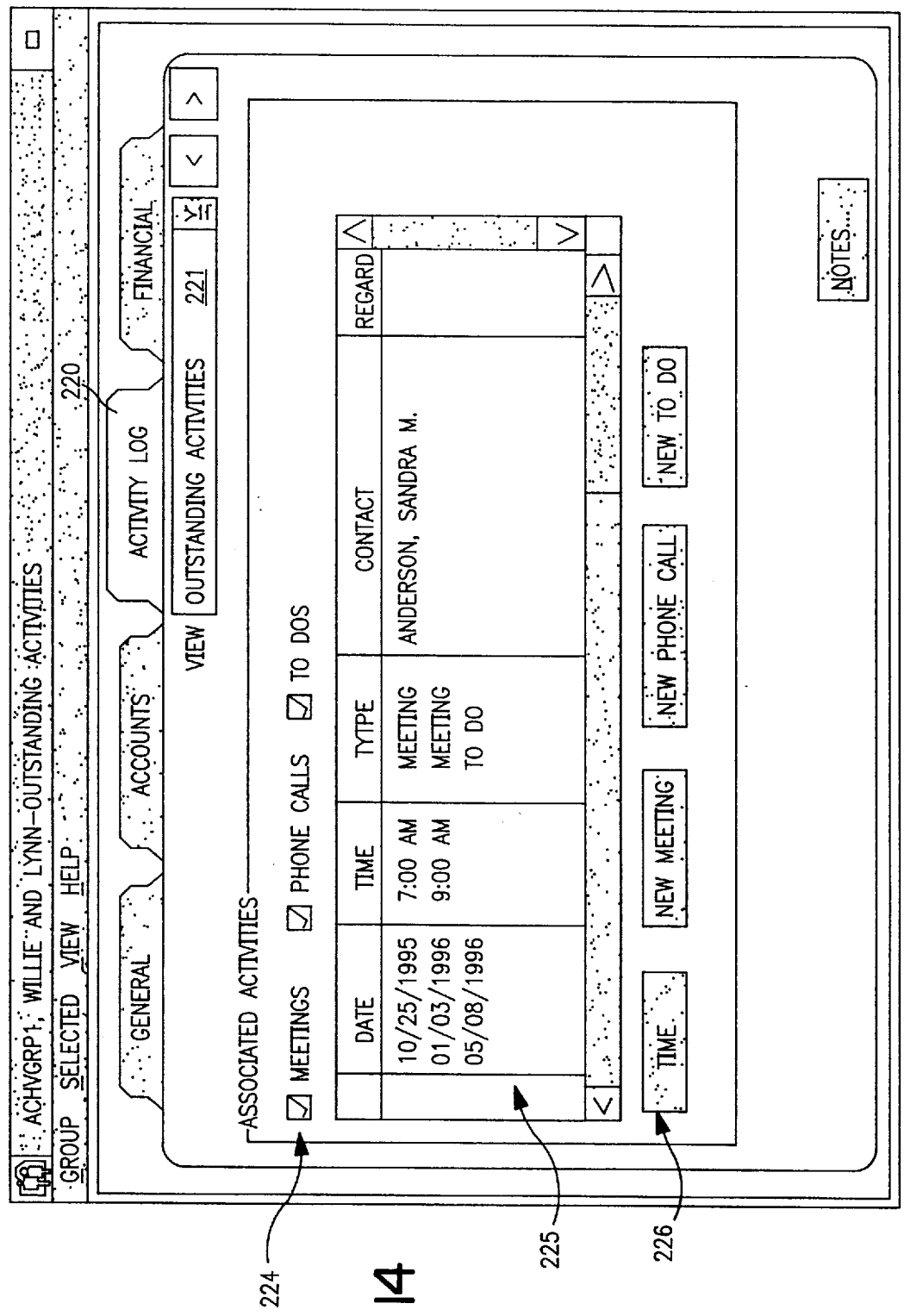
FIG. 14 is an exemplary OUTSTANDING ACTIVITIES screen view of the ACTIVITY LOG in accordance with a preferred embodiment of the present invention.
Figure 15:
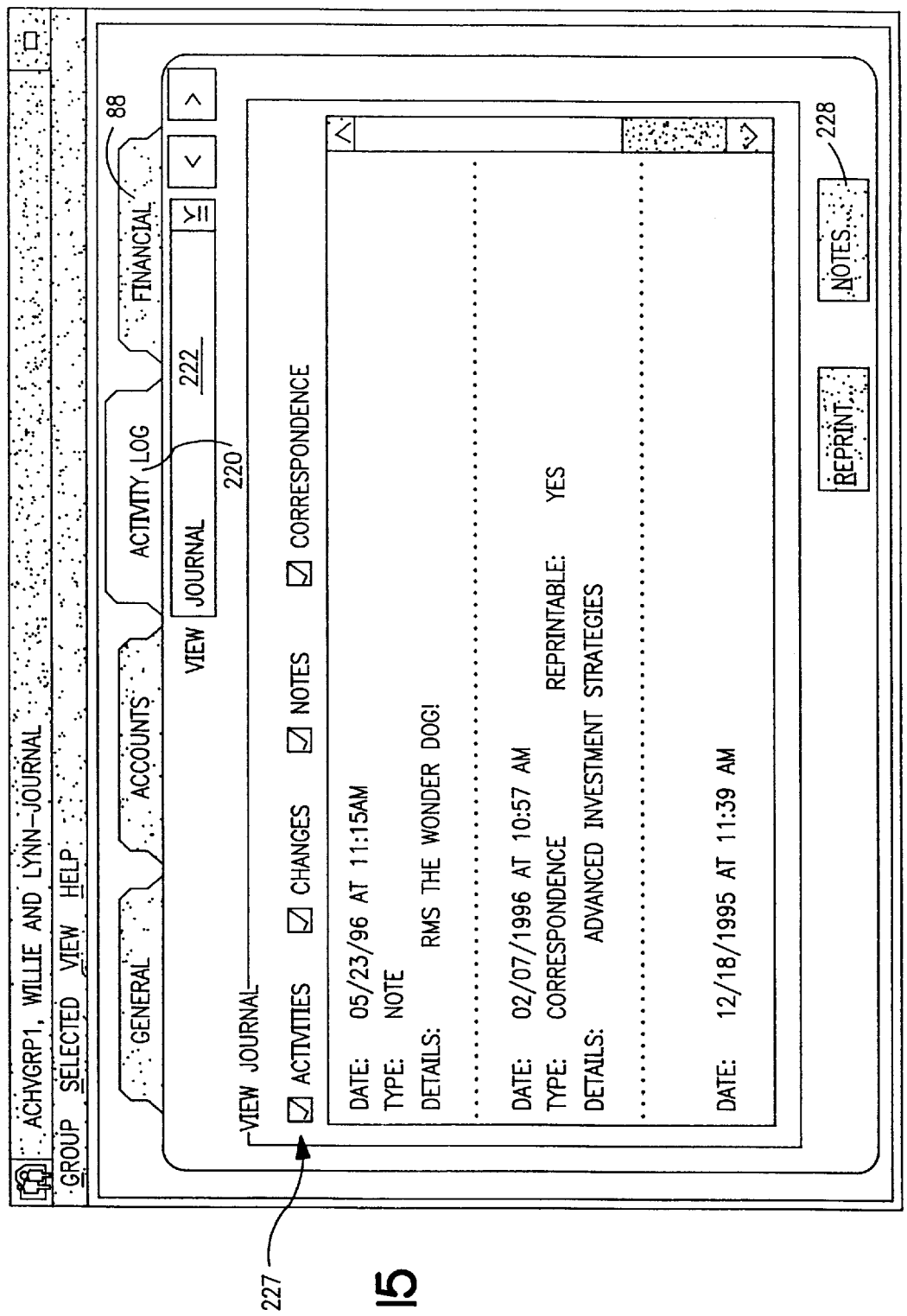
FIG. 15 is an exemplary JOURNAL screen view of the ACTIVITY LOG in accordance with a preferred embodiment of the present invention.

With continued reference to FIG. 7, under ACTIVITY LOG TAB 126, Journal and Future activities VIEWs 134 are preferably available. With reference to FIGS. 14 and 15, ACTIVITY LOG TAB 220 preferably includes OUTSTANDING ACTIVITIES 221 and JOURNAL 222. With reference to FIG. 14, OUTSTANDING ACTIVITIES VIEW 221 suitably provides an advisor the ability to view all activities for a GROUP (future and past) that do not have a status of "complete." Checkboxes 224 at the top of the OUTSTANDING ACTIVITIES VIEW 221 (Meetings, Phone calls, To Dos) allow an advisor to "filter" the items seen in information box 225. The scheduling of activities from this VIEW 221 is also possible through the use of buttons 226, i.e. NEW PHONE CALL, NEW MEETING and NEW TODO.

JOURNAL VIEW 222 preferably provides a history of all activities, changes, notes and correspondence 227 for a particular GROUP. This information is important for an advisor's practice management, regulatory compliance and customer service. The checkboxes 227 suitably allow an advisor to "filter" the items seen in JOURNAL 222. NOTES 228 are extra pop-up windows allowing an advisor to indicate specific comments about a transaction or CLIENT GROUP. An advisor can also obtain a listing of all notes entered relating to a GROUP. The benefit of VIEW 222 is that advisors have the capability to edit note 228 from the menu bar option of EDIT AND DELETE NOTES.

In a prefered embodiment, an ORGANIZATION includes small businesses and pensions. A person skilled in the art will appreciate that an ORGANIZATION may include any suitable combination of people in a related entity. If an advisor is working with small businesses, APPLICATION 18 suitably tracks information, servicing and scheduling similar to PERSON tracking, as described above. The GROUP information is preferably also similar to the above description for GROUP.

The selection of ORGANIZATION from GROUP MEMBERSHIP View 134 preferably brings an advisor to GENERAL View of ORGANIZATION. GENERAL View preferably includes ORGANIZATION Preferred Name and Legal Name (i.e., IBM versus International Business Machines), Tax ID#, entity type (since ORGANIZATIONs are also trusts, these options are also available), broker/dealer indicator (is the ORGANIZATION in the securities market), mailing Name and the first contact. Each contact/owner includes Preferred (First) Name, Last Name, Responsibility, Phone (work) and FAX (work). The buttons preferably include Open, Add existing owner, add existing contact, add owner and add contact. ORGANIZATION includes ORGANIZATION, SELECTED, View and HELP. New ORGANIZATION sets up a new ORGANIZATION, Print brings up a print menu for employees and Close closes the View and goes back to GROUP or closes the view. Select preferably includes New consisting of Owner, Contact, Employee; Open consisting of Owner, Contact, Employee; Add existing consisting of Owner, Contact, Employee; and Delete consisting of Owner, Contact, Employee. View includes General, Address, Background, Employees, User-defined Attributes, and Preferences.

ADDRESS View is preferably similar to other address VIEWs 134. Background View includes information about the business preferably including Growth, organizational reporting, and valuation. The growth preferably includes annual earnings, number of employees and stability (Stable, Increasing, decreasing, or unknown). The organizational reporting has Inception date, fiscal year end (mm/dd —defaults to 12/31) and Type of Industry. The Valuation information is Dollar amount, method of valuation and date of valuation. EMPLOYEE View has information about the employee base preferably including Preferred (First) name, Last, Tax ID#, Job Title, Phone Number, Officer, Key Employee, Related to Owner and FES Seminar. An user-defined fields are preferably similar to an user-defined fields for the PERSON.

The CONTACT for an ORGANIZATION is preferably similar to setting up a PERSON except that only General and Address View exists. Added to GENERAL View is preferably Position information including Contact Indicator, Employee indicator, Responsibility for or area of work and CLIENT ID# (If appropriate). The owner for an ORGANIZATION is similar to the contact, but has the additional indicator of an owner and % of ownership. Job Title is preferably available to both contacts and owners.

The GROUP preferably includes non-person legal entities, i.e. trusts, fiduciaries, 503Cs, but the GROUP always includes a PERSON or ORGANIZATION that represents the GROUP. In APPLICATION 18, members and accounts of the pension groups are part of an ORGANIZATIONAL GROUP, but the details (i.e., ENTITY TYPE) of the pension group are preferably located in ORGANIZATIONAL View.

In a prefered embodiment, APPLICATION 18 also suitably allows advisors to show reciprocal relationships. For example, if an advisor defines the relationship as PERSON 1 "is the child of" PERSON 2, APPLICATION 18 preferably shows the reciprocal relationship as PERSON 2 "is the parent of" PERSON 1. The relationship date field preferably shows the beginning date of the relationship. If the relationship is "married to", the relationship date is preferably the wedding date. If the relationship is "child of", the relationship date is preferably the child's date of birth (or date of adoption).

Furthermore, in a prefered embodiment, an advisor suitably defines blood and non-blood relationships. A contact may have only one blood relationship, but many non-blood relationships. The PERSON in the relationship does not need to be someone who currently exists in DB2/2 DATABASE 22. An advisor preferably chooses from a large variety of relationship indicators, i.e. married to, child of, brother of, friend of, trustee of, divorced from, beneficiary of, etc.. As an alternative embodiment, an advisor suitably adds a relationship that may not be a standard entry.

Customer service is one of the major keys to an advisor's practice. Advisors can also use APPLICATION 18 as a practice management tool to help run their businesses. In a prefered embodiment, APPLICATION 18 suitably provides an effective way for advisors to not only track the last time they interacted with a particular client, but allows an advisor to be proactive and plan the next visit or phone call. Once an advisor implements CALENDAR 86 events, as more fully described below, and service information, tracking reports suitably provide key information about the client that occurs within an advisor's practice. For example, advisors preferably display a list of the types of service history applied to each client, activities that have occurred by specific type of call or meeting, and a breakdown of the clients by client Acquisition Type.

In Service View of General Tab 122, an advisor preferably chooses the service frequency for the client from the "Service Frequency" drop-down list. The options preferably include Annual 1st quarter, Annual 2nd quarter, Annual 3rd quarter, Annual 4th quarter, Semi-Annual 1st and 3rd quarters, Semi-Annual 2nd and 4th quarters or Quarterly. In a preferred embodiment, APPLICATION 18 automatically calculates the month(s) in which an advisor needs to see, mail or call the client based on the service frequency and on the date in the Next Consolidated Statement date field and sets TRIGGERS 365 for those activities.

Figure 8:
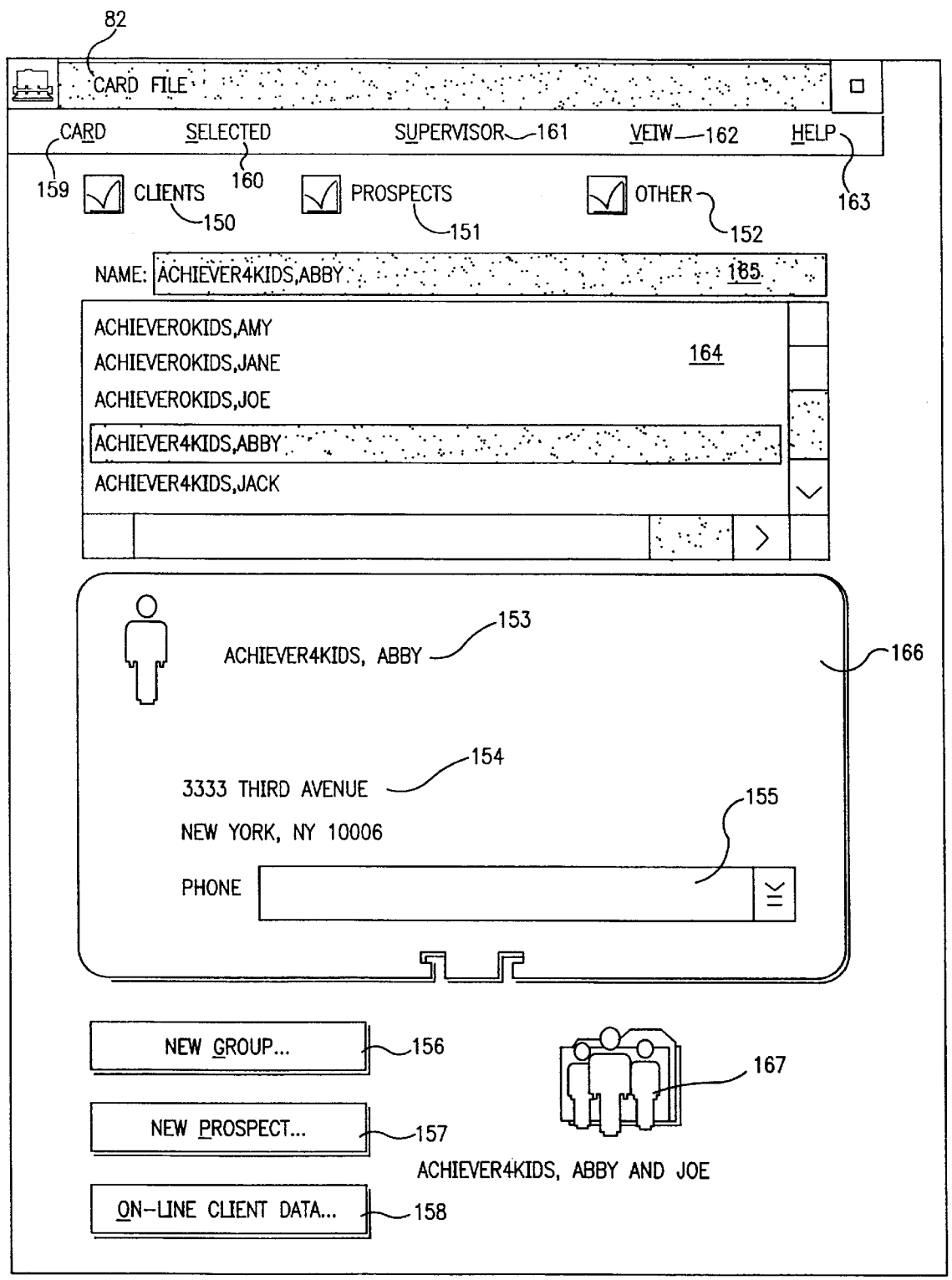
FIG. 8 is an exemplary screen view of a CARD FILE in accordance with one aspect of the present invention.
Figure 9:
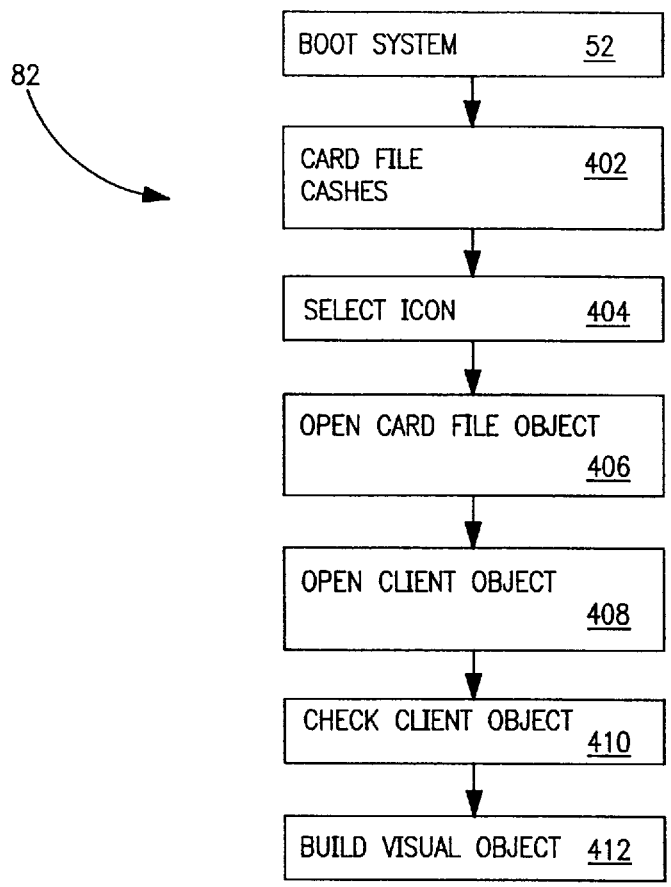
FIG. 9 is an exemplary flow diagram that illustrates an exemplary CARD FILE routine in accordance with one aspect of the present invention.

With momentary reference to FIG. 8, an exemplary CARD FILE 82 is illustrated. CARD FILE 82 is a suitable feature for quickly finding a PERSON(s) or ORGANIZATION(s) in DATABASE 22. With reference to FIG. 9, an exemplary CARD FILE 82 routine is illustrated. As discussed, upon booting APPLICATION 18 (step 52), CARD FILE 82 is suitably cached (step 402) and the LIST PROXIES representing each PERSON or ORGANIZATION in CARD FILE 82 exist. An advisor preferably selects CARD FILE 82 icon (step 404), causing the operating APPLICATION 18 to suitably communicate with APPLICATION 18, thereby opening CARD FILE 82 VISUAL OBJECT (step 406). When CARD FILE 82 is opened, CARD FILE 82 OBJECT suitably requests that its PROXY obtain a PERSON or ORGANIZATION OBJECT from PERSISTENCE FRAMEWORK (step 408). To adhere to the specific listing requested by an advisor, the PROXY suitably checks each PERSON or ORGANIZATION OBJECT (step 410) to determine if the individual PERSON or ORGANIZATION OBJECT is a CLIENT, PROSPECT or OTHER before sending the information to CARD FILE 82. Once all of the information is obtained, CARD FILE 82 suitably builds the VISUAL OBJECT display of PERSON or ORGANIZATIONs (step 412). In an alternative embodiment, an advisor can load purchased prospects (i.e., a listing of prospects from commonly known database companies or an employer) into DB2/2 DATABASE 22 via a connection program from the data utility 32 folder of APPLICATION 18.

With reference to FIG. 8, opening CARD FILE 82 icon provides an easy way for advisors to access information about contacts in their DATABASE. Through CARD FILE 82, advisors can get address and phone information, add clients or PROSPECTs to DATABASE 22, and access client data on MAINFRAME 40. As previously discussed, Client is preferably defined as owning a corporate product or service. PROSPECTs are preferably defined as individuals who do not yet own a product or service (i.e. PROSPECTIVE clients). OTHER individuals are preferably defined as general contacts, e.g. a CPA, lawyer, employees of an organization, etc., that may be PROSPECTs in the future, and eventually clients.

CARD FILE 82 preferably includes clients 150, PROSPECTs 151, or OTHER PERSONS/ORGANIZATIONs 152.

By suitably activating various combinations of boxes, an advisor preferably selects/filters GROUPs that contain a PERSON or ORGANIZATION, namely clients 150, PROSPECTs 151 or OTHERs 152, or a combination thereof. The card display in CARD FILE 82 preferably contains a preferred name 153, address 154 and telephone number(s) 155.

With continued reference to FIG. 8, in a prefered embodiment, an advisor suitably opens a selected PERSON, GROUP, or ORGANIZATION in CARD FILE 82. As an example, "Abby Achiever4kids" is the selected person in FIG. 8. As an alternative embodiment, an advisor can also open a PERSON, ORGANIZATION, or GROUP icon from FRONT PANEL 80 or Parking Lot 90. By suitably selecting the name in name list box 164 of CARD FILE 82, an advisor opens the GROUP associated with that PERSON or ORGANIZATION. If the name of the PERSON or ORGANIZATION is not associated with a GROUP, then CARD FILE 82 will preferably open that individual PERSON or ORGANIZATION, and not the GROUP.

Figure 20:
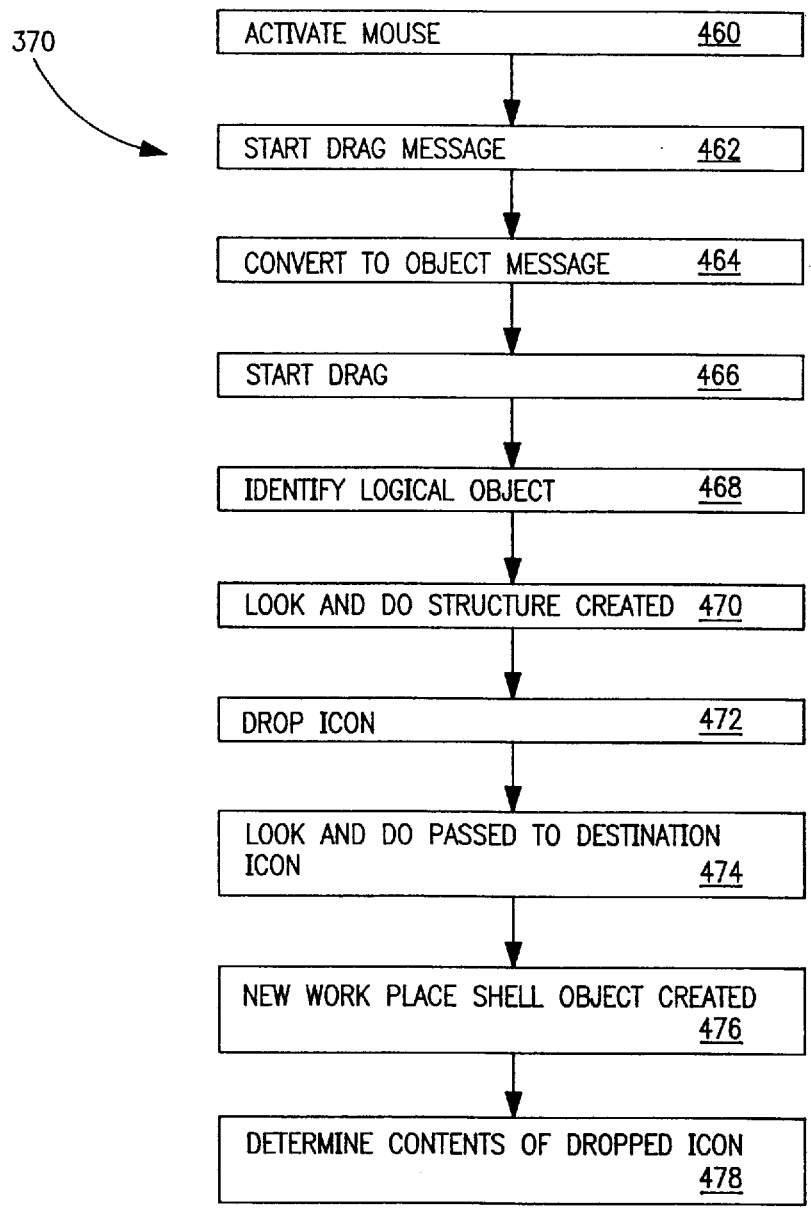
FIG. 20 is an exemplary flow diagram that illustrates an exemplary DRAG and DROP routine in accordance with one aspect of the present invention; and, FIG. 21 is an exemplary EXTERNAL ADVISOR screen view in accordance with one aspect of the present invention.

In a prefered embodiment, CARD FILE 82 is the launching point for other functions. Within CARD FILE 82, other functions preferably can be suitably initiated using buttons (Add New GROUPs 156, Add New PROSPECTs 157, or ON-LINE CLIENT DATA 158), DRAG and DROP 370 (see FIG. 20) action from the icons, or selection of GROUP or individual icons. For example, when New GROUP 156 is selected, an OBJECT is already built but the OBJECT contains no data. Thus, the VISUAL OBJECT prompts an advisor to input the appropriate data.

CARD FILE 82 pull-down menus preferably include CARD 159, SELECTED 160, SUPERVISOR 161, VIEW 162 and HELP 163. CARD MENU 159 preferably includes Close which closes CARD FILE 82 and Export GROUP, as explained more fully below, which is suitably utilized to send the information on a GROUP, via e-mail or diskette, to be imported into another data base, e.g. an assistant or another advisor.

SELECTED menu 160 preferably includes CREATE A NEW GROUP, NEW GROUP and New PROSPECT (not shown) which suitably prompts an advisor to input information related to a new prospect. Additional commands under SELECTED 160 preferably include NEW OTHER (PERSON) which suitably creates a new individual that will be classified as OTHER in CARD FILE 82 and New OTHER (ORGANIZATION) which suitably creates a new ORGANIZATION, e.g. small business that is classified as OTHER on CARD FILE 82. OPEN under SELECTED 160 preferably includes Open an Existing GROUP, Open an Existing PERSON (individual), and Open an Existing ORGANIZATION. The Open and Delete commands are preferably activated only when a GROUP, PERSON or ORGANIZATION has been selected in CARD FILE 82. The Delete command allows an advisor to suitably delete an existing GROUP. ON-LINE CLIENT DATA 158 in SELECTED MENU 160 is only activated when an existing client GROUP is suitably selected in CARD FILE 82. ON-LINE CLIENT DATA 158 suitably allows an advisor, once connected to the network, to view account information in MAINFRAME 40. This command is also a button on the lower portion of CARD FILE 82.

VIEW MENU 162 suitably allows an advisor to view various combinations of clients 150, PROSPECTs 151 and OTHERs 152 in the namelist of CARD FILE 82, i.e., include clients 150 would show only clients 150 in CARD FILE 82, and not PROSPECTs and OTHERs. These menu choices can also be activated by the three "check boxes" on CARD FILE 82. When first activated, CARD FILE 82 preferably defaults to showing all clients 150, PROSPECTs 151, and OTHER individuals 152 in Name List box 164. If an advisor wants to only view clients 150, an advisor would un-check the PROSPECTs 151 and OTHER 152 check boxes, which would shorten the list of names shown in Name List box 164 to include only clients. The choices (not shown) in the HELP menu 163 preferably include General HELP and Product Information. General HELP displays HELP APPLICATION 18. Product Information displays the version and other information about the system.

With continued reference to FIG. 8, by placing the cursor in Name Input box 165, an advisor quickly jumps to a specific PERSON or ORGANIZATION, as opposed to scrolling down a long list of names. Upon entering an "M", Name Input box 165 quickly displays the M's in the PERSON or ORGANIZATION list box 164. After selecting a PERSON or ORGANIZATION, a visual card 166 is displayed with information on that individual. Visual card 166 preferably includes an icon 167 that represents that PERSON. Primary address 154 of that individual is preferably produced directly under name 153 and all relevant phone numbers 155. By selecting the pull down arrow in the phone number field 155, alternative phone numbers are suitably displayed. In a prefered embodiment, the home phone number is the default at the top of the phone number list 155. If no home number exists, then work number is preferably the next default.

A selected individual is preferably represented by a GROUP icon 167. An individual may belong to multiple GROUPs, in which case, the GROUP icon preferably includes the label "GROUPs." If an advisor selects the GROUP icon when it says "GROUPs" (because the individuals belong to multiple GROUPs or households) a dialog box suitably pops up (not shown). Selecting GROUPs allows an advisor to see the various GROUPs of which the individual is a member. An advisor then suitably selects one of the GROUPs, thereby opening the GROUP.

With continued reference to FIG. 8, in a prefered embodiment, the buttons in CARD FILE 82 preferably include NEW GROUP 156, NEW PROSPECT 157 and ONLINE CLIENT DATA 158. Creating a new client GROUP, PROSPECT GROUP, PERSON or ORGANIZATION can suitably be executed from either a button or a menu bar in CARD FILE 82. Those skilled in the art will appreciate that "New" implies that the PERSON or ORGANIZATION does not exist already in CARD FILE 82 and "Existing" implies that the PERSON has a card in an advisor's CARD FILE 82. The New GROUP button 156 preferably allows an advisor to create a new GROUP or household, e.g. a new client GROUP. Creating a new GROUP 156 suitably opens a new GROUP folder (not shown) with blank spaces for the purposes of adding information about this GROUP, i.e., add individuals and information about those individuals.

The NEW GROUP folder allows an advisor to add members (clients), either new or existing, to a GROUP and add characteristics/attributes (demographic information, market information, etc.) associated with the GROUP. An advisor also suitably creates preferences for the GROUP name (male name first or female name first), the salutation (Dear Tom instead of Dear Thomas), and the mailing name (first line of address). These preferences apply to all of an advisor's NEW GROUPs. Furthermore, an advisor can view and close the GROUP screens without adding information. If, however, an advisor adds information without names, the GROUP will be labeled "Empty GROUP". This "Empty GROUP" label serves as a flag to an advisor that he or she has stored information for a GROUP without attaching a name to it. An advisor can then go back to the GROUP and add the names at a later time.

Clicking the New PROSPECT button 157 produces a screen that allows the user to input a new PROSPECT into GROUP PROSPECT VIEW 170, as illustrated in FIG. 8a. This screen has been designed to be a subset of the information in the client GROUP file folder screen to promote quick capture of PROSPECT information. Because advisors do not need to input or know as much information about a prospect, the VISUAL OBJECT for a new PROSPECT GROUP includes a condensed version (one screen) of information, as illustrated in FIG. 8a. This one-page view establishes a GROUP PROSPECT VIEW 170 including additional information e.g., address, phone, and other known demographics. Once a PROSPECT converts to a client, all information input in this view transfers to the client file GROUP file folder view.

With continued reference to FIG. 8a, PROSPECT VIEW 170 preferably includes PROSPECT 171, SELECTED 172 and HELP 173. Although the menu items are shown with reference to FIG. 8a, for simplicity, the contents of each menu item will be described below without being specifically displayed in FIG. 8a. Under PROSPECT 171, NEW PROSPECT creates a new PROSPECT, Print prints the information on the PROSPECT and Close closes the PROSPECT window. SELECTED menu 172 preferably includes Open VIEW which allows two choices, 1st PROSPECT 176 and 2nd PROSPECT 177. With this feature, an advisor suitably inputs more information on an individual than is possible on the PROSPECT information window. FIELDS within PROSPECT VIEW preferably includes Names which allows two PROSPECTs, Address with one main residence and Phone with two phone numbers, one home and one work displayed by a pull-down select box. Under PROSPECT VIEW, a BEST TIME TO CALL is available along with a DON'T CALL option. Client ACQUISITION TECHNIQUES 178 preferably includes NUMBER whereby an advisor inputs a specific lead number, e.g. from leads APPLICATION 18. RECOMMENDED BY 179 includes an ADD PERSON button, which is preferably always activated, and a REMOVE PERSON button, which is preferably only activated if there is a name in the RECOMMENDED BY section 179. To add a client in the RECOMMENDED BY section, an advisor suitably selects ADD PERSON and use the PERSON Search Window.

The PERSON Search Window acts similarly to CARD FILE 82, listing all PEOPLE in DATABASE 22 (including clients, PROSPECTs and OTHER). Like CARD FILE 82, an advisor preferably types a last name, first name or letter to move quickly to the desired PERSON. Once an advisor finds the PERSON and selects SAVE, the PERSON is added to the RECOMMENDED BY section of the PROSPECT Information View. The Remove PERSON button is then activated for removing the selected PERSON. Only one PERSON can be listed in the Recommended By section.

PRIMARY INTERESTS 180 is preferably a text input field that allows an advisor to record interests or notes from conversations with the PROSPECT. Once the PROSPECT becomes a client, all information captured is transferred to the Primary Interests box in the marketing section of the client GROUP file folder. SALUTATION establishes the Dear: portion of a letter and MAILING NAME establishes the envelope line of a letter. TARGET MARKET is a text input field and Market Segment is a pull down select box with predetermined choices.

The PROSPECT INFORMATION window 170 also preferably includes SAVE/RETURN that saves the input made into this window and returns an advisor to CARD FILE 82 or desktop. The SAVE/ADD ANOTHER button saves the information on this PROSPECT and allows an advisor to input another PROSPECT (this enables quick data entry of multiple PROSPECTs). The PROSPECT INFORMATION window 170 also includes a Cancel button.

With continued reference to FIG. 8a, Next Contact 181 is preferably a text field that reads Unscheduled when there are no future meetings or phone calls scheduled. If a meeting or phone call exists, the date of the next future activity is displayed. Open As PROSPECT VIEW 182 is a "check box" that is checked as a default, thereby preserving the subset PROSPECT VIEW. If the box is unchecked, then the PROSPECT GROUP is suitably re-opened the next time it is selected from CARD FILE 82 with the file folder GROUP VIEW. Once selected and the PROSPECT is converted to the larger file folder VIEW, it cannot be re-opened in the PROSPECT VIEW.

With reference to FIG. 8, creating OTHER PERSONS and OTHER ORGANIZATIONs does not create GROUPs. PERSONS and ORGANIZATIONs in this category include EXTERNAL ADVISOR 490, employees, contacts, owners, and service personnel or organizations (e.g., express couriers). This is an especially helpful feature for advisors in that it facilitates the management of their practice by allowing them to store all their contacts in one location.

With reference to FIG. 7, CARD FILE 82 allows an advisor to add a contact to a GROUP. ADD EXISTING 139 button under the GROUP MEMBERSHIP View 134 allows an advisor to add a contact that is currently in DATABASE 22 to the current GROUP without having to re-input the data. The contact can be selected from the PERSON/ORGANIZATION search View, which allows an advisor to quickly find a client/individual or ORGANIZATION to add to the GROUP. This feature is advantageous because it connects clients/GROUPs in the DATABASE, thereby establishing the correct relationships and keeping APPLICATION 18 free of redundant data. Specifically, APPLICATION 18 recognizes simple core relationships so that if a PERSON is denoted as a father of another PERSON, the other PERSON will automatically be denoted as the son of the later. The relationships are established by a RELATIONSHIP OBJECT which understands the reciprocal relationships.

ADD EXISTING button 139 is preferably present in the GROUP MEMBERSHIP View 134 (as shown in FIG. 7), RELATIONSHIP View, ORGANIZATION View (add existing contact or add existing owner), EMPLOYEE View and EXTERNAL ADVISOR 490 View. ADD EXISTING is also present in the locations in which a client or GROUP could be added, e.g., REFERRED BY or ADD client or ORGANIZATION in the ACTIVITY View.

Figure 10:
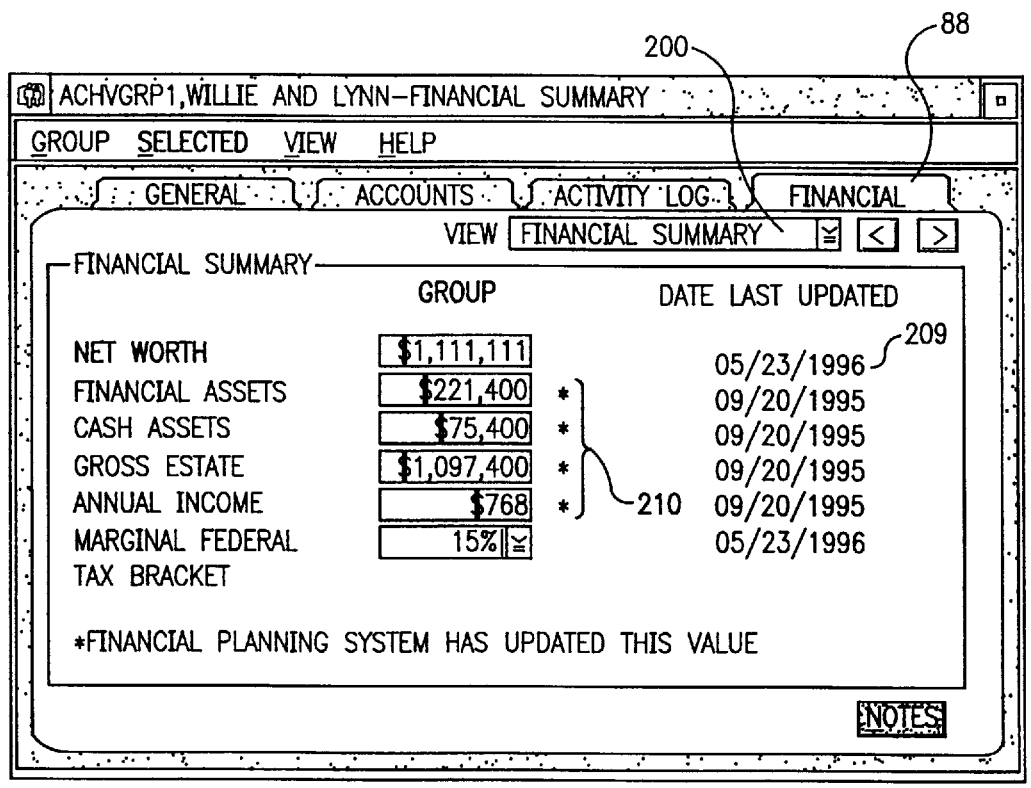
FIG. 10 is an exemplary Financial Summary screen view of The Financial Tab.
Figure 11:
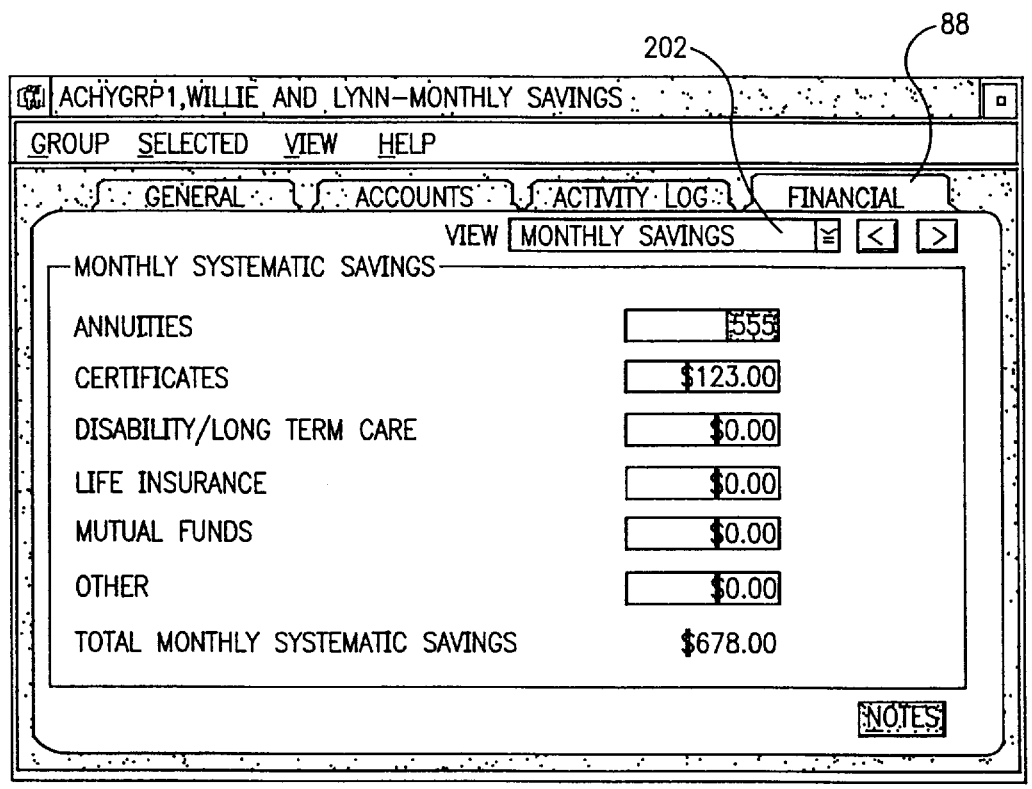
FIG. 11 is an exemplary Monthly Savings screen view of The Financial Tab.
Figure 12:
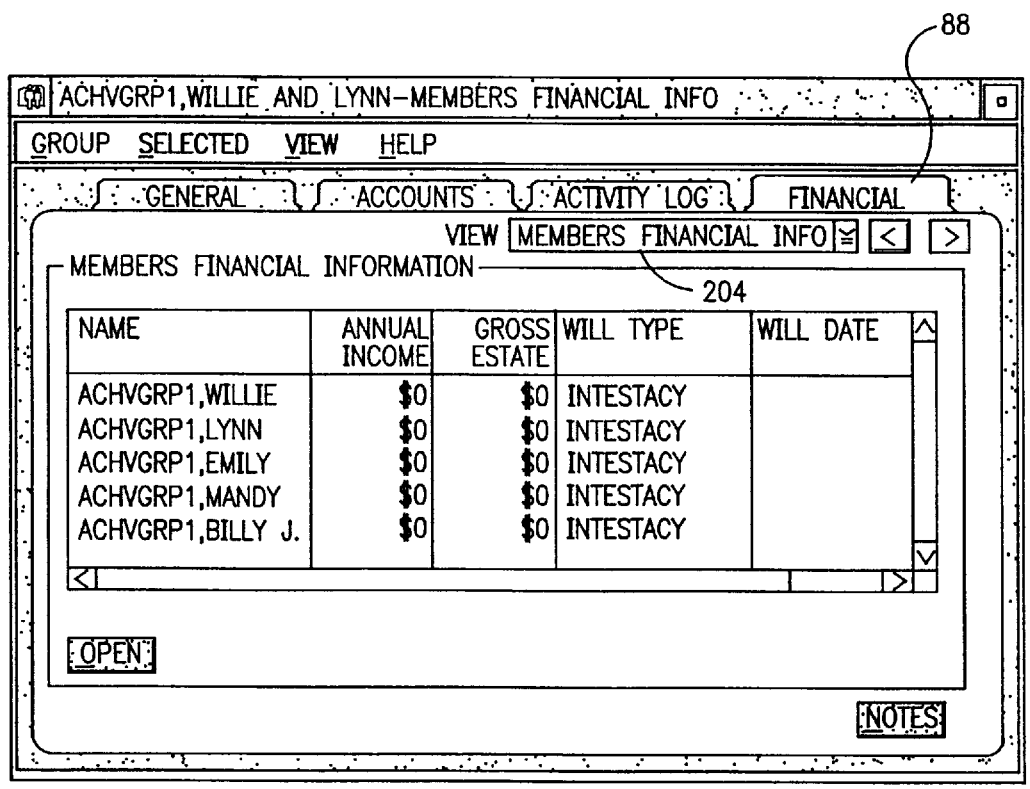
FIG. 12 is an exemplary Members Financial Information screen view of The Financial Tab.
Figure 13:
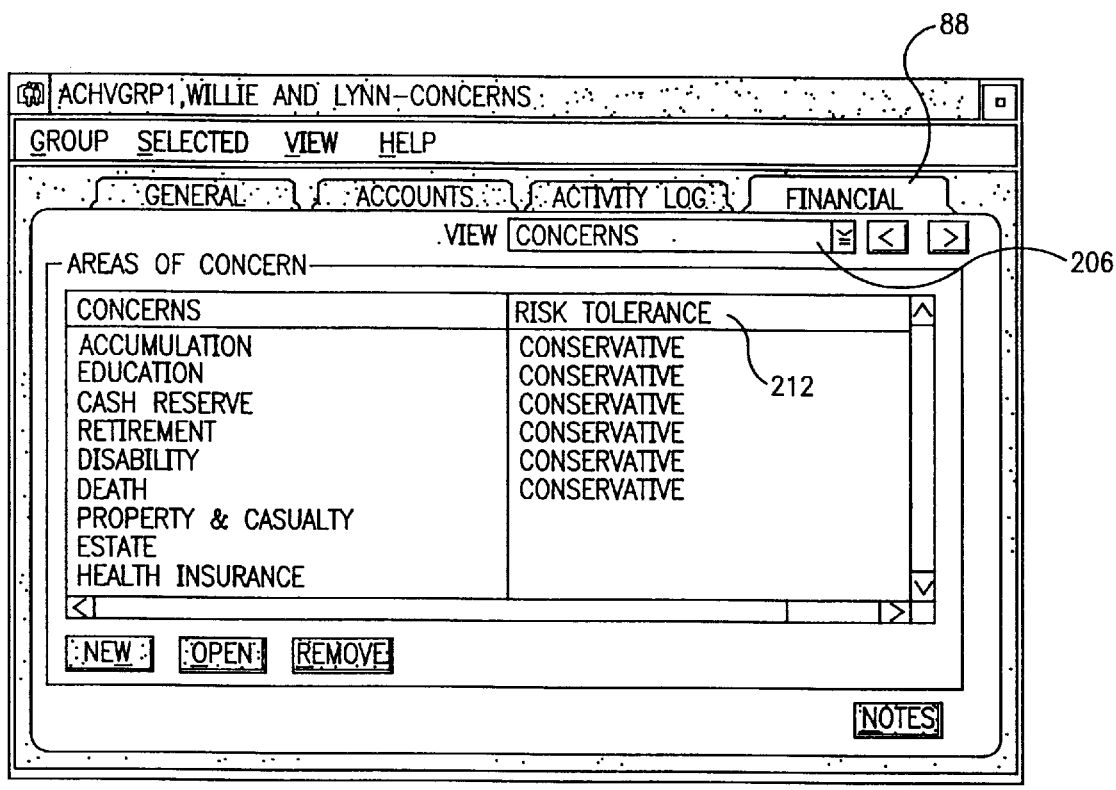
FIG. 13 is an exemplary Concerns screen view of The Financial Tab.

With reference to FIGS. 10—13, Financial Tab 88 preferably includes Financial Summary 200 (FIG. 10), monthly savings 202 (FIG. 11), members financial information 204 (FIG. 12) and concerns 206 (FIG. 13). With reference to FIG. 10, financial summary information preferably includes fields such as the value of the net worth, financial assets, cash assets, gross estate and annual income. The value in each of the Financial Summary fields is preferably inputted by an advisor. Furthermore, an advisor suitably selects the marginal federal tax bracket for the group. In a prefered embodiment, each of these fields are suitably time stamped 209 with the last update from an outside Financial Planning source. Each of the fields indicated by an asterisk 210 has been suitably updated from the Financial Planning source.

With reference to FIG. 11, Monthly Savings 202 preferably include the monthly systematic savings, i.e. bank authorizations for all of the mutual funds that a group owns. In a preferred embodiment, the systematic savings exist for the categories of annuities, certificates, disability/long-term care, life insurance, mutual funds, other and total monthly systematic savings.

With reference to FIG. 12, Members Financial Information 204 suitably allows for the input of name, annual incomes, gross estate, will type and will date. Highlighting a PERSON yields financial information about the PERSON.

With reference to FIG. 13, Concerns 206 for a Group are listed along with a respective risk tolerance 212. A Concern 206 is preferably a general goal without a specific individual involved, i.e. having the financial strategy to finance a son's college education is a goal, whereas having a financial strategy for education in general is a concern. Select concerns preferably include risk tolerances 212 such as, in a prefered embodiment, conservative, moderately conservative, moderately aggressive and aggressive. In a preferred embodiment, conservative is the default tolerance. To promote the integration of systems, a two-way transfer of concern data 206 preferably exists with system 5 and a financial planning source.

Figure 16:
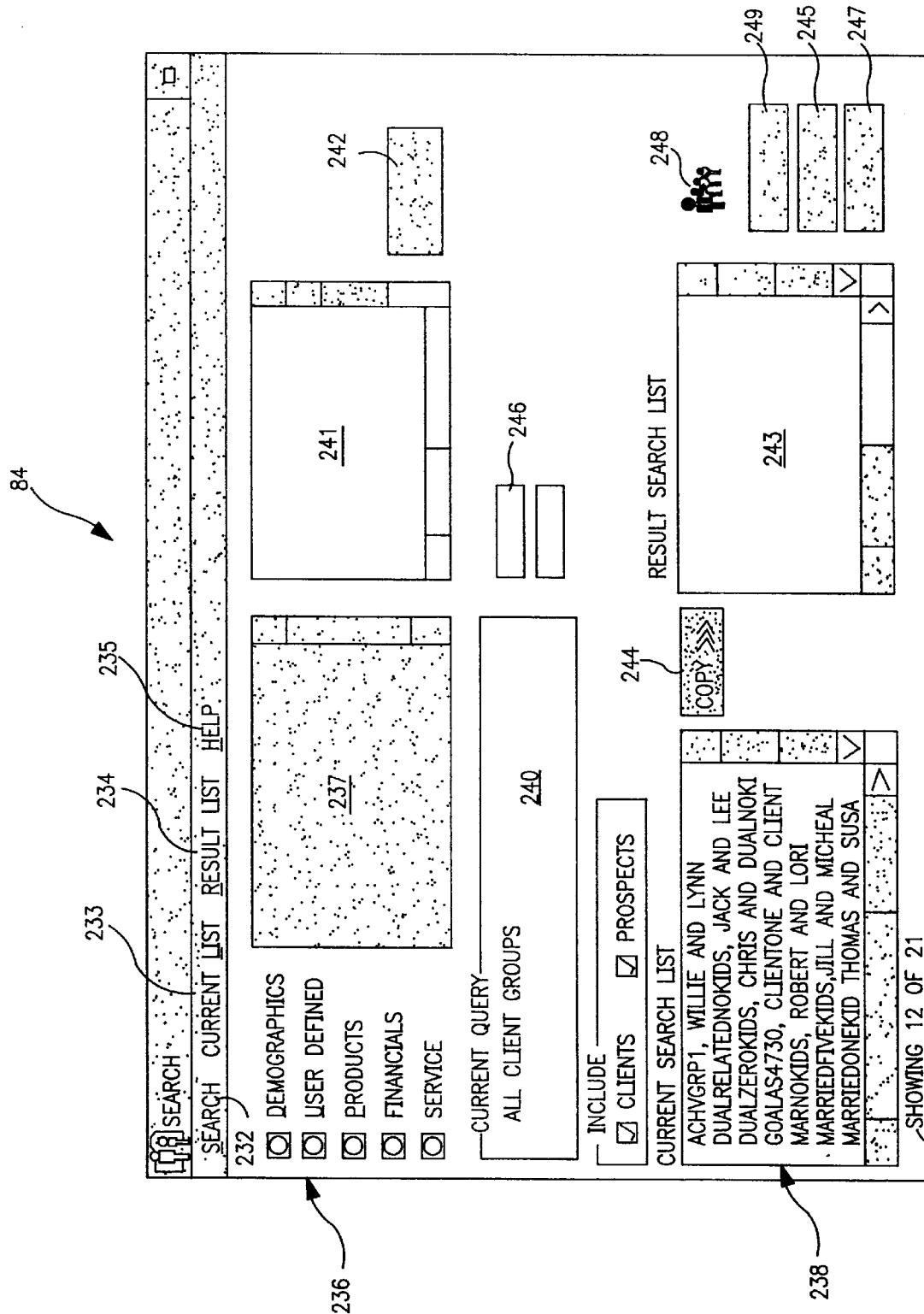
FIG. 16 is an exemplary screen view of the Search Engine in accordance with one aspect of the present invention.

With momentary reference to FIG. 4, an advisor next utilizes SEARCH ENGINE 84 to sort and analyze data (step 72). With reference to FIG. 16, SEARCH ENGINE 84 suitably conducts searches based not only on common demographic information, but also on FINANCIAL 88 specific information. For example, searches preferably include account information, client financial concerns and goals. An advisor utilizes the results of SEARCH ENGINE 84 in a number of different ways in a preferred embodiment. For example, SEARCH 84 is preferably used for finding a particular GROUP or GROUPs, producing mail merge letters for mass mailing, producing specific sales literature for a select number of clients most appropriate for the particular information.

In a preferred embodiment, SEARCH ENGINE 84 utilizes a cumulative search facility allowing point and click selection of search criteria, thereby requiring minimal data entry and substantially eliminating the need for complex logic combinations. SEARCH ENGINE 84 preferably uses STRUCTURED QUERY LANGUAGE (SQL), a common relational database language, to allow advisors to analyze their clients and PROSPECTs by executing searches one at a time. DATABASE MANAGER 21 suitably performs SQL searches based upon criteria specified by an advisor during interaction with APPLICATION 18. With reference to FIG. 16, the menu Bar preferably includes SEARCH 232, CURRENT LIST 233, RESULT LIST 234 and HELP 235.

With continued reference to FIG. 16, an advisor preferably selects the search criteria 236 and search argument 237 from a list of easy-to-understand commands, then simply performs the search against the current list of GROUPs 238. In an alternative embodiment, an advisor uses sequential tests as the search criteria 236. Additionally, APPLICATION 18 displays the total number of GROUPs available to view 239 in the CURRENT LIST 238.

In a preferred embodiment, the five categories of search criteria 236 preferably includes demographics, User Defined Fields, Products, Financials and Service. Demographics preferably includes PERSON, GROUP AND ORGANIZATION information (name, address, age, gender, etc.) except user-defined data and product data. User-Defined data preferably includes information defined by advisors including hobbies or information not generally tracked. Products preferably includes branches of products, such as Categories (certificates, mutual funds, etc.), Subcategories (equity funds, bonds, etc.) and specific product Names and values of products. Exemplary financial information about a GROUP preferably includes net worth, annual income, gross estate, goals and risk tolerance. Service suitably allows advisors to search time-sensitive client data e.g., consolidated statement dates, last service date, account opened date, etc. Service is useful to advisors during the New Business process.

Figure 17:
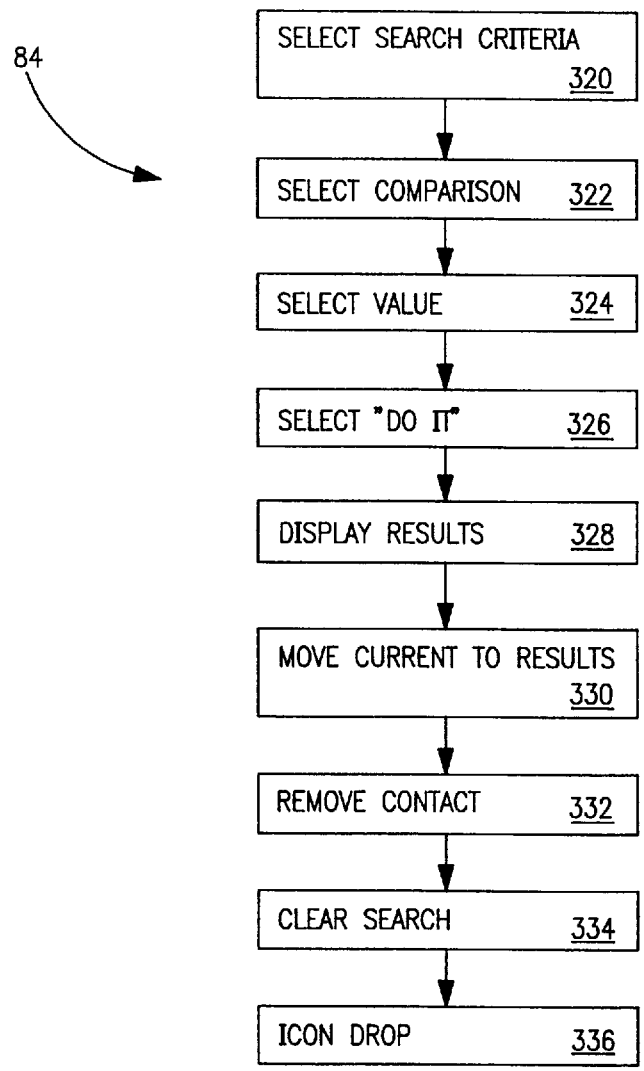
FIG. 17 is an exemplary flow diagram that illustrates the operation of SEARCH ENGINE in accordance with one aspect of the present invention.

More particularly, an exemplary SEARCH ENGINE 84 is illustrated in FIG. 17. With reference to FIGS. 16 and 17, using a series of mouse selections, rather than complex Boolean logic, an advisor defines search criteria 236, using comparators and qualifiers, which then appear in Current query box 240 (step 320). Once the first searchable field is suitably selected, comparison box 241 populates with choices for selection by advisor (step 322). Exemplary comparators from comparison box 241 preferably include "has", does not have," "greater than or equal to," "less than or equal to," "contains," "does not contain," "equal to," and "not equal to." Exemplary qualifiers preferably include typing an actual age, dollar amount, or clicking a true/false button. A value box (not shown) next suitably appears that permits an advisor to enter a value or select from a drop down list of values (step 324). An advisor then selects "Do It" 242 (step 326). The results of the search, clients and/or PROSPECTs who match the criteria, are displayed in CURRENT LIST 238 (step 328). The description of search (i.e. "All client groups") and Number of Total found are preferably displayed in current query box 240.

The query APPLICATION 18 in SEARCH ENGINE 84 is based on the notion of "successive subtraction." An advisor preferably starts with a set of criteria and successively removes from that list those clients that do not meet the current query criteria. When an advisor has completed the search, an advisor moves the contacts in Current search list box 238 to Result search list box 243 by selecting Copy button 244 (step 330). In an alternative embodiment, an advisor moves a subset of the contacts in Current list box 238 by highlighting them and selecting COPY button 244.

In a prefered embodiment, an advisor removes a contact from Result list 243 by highlighting the contact and selecting "Omit SELECTED" button 245 (step 332). An advisor clears the last search query 240 by selecting "Undo Last" button 246 (step 334). An advisor additionally clears entire result list 243 by selecting "Clear All" button 247.

SEARCH ENGINE 84 suitably creates a search icon 248, such that an advisor performs Icon Drop operations or create reports (step 336). To operate, an advisor simply drags SEARCH ICON 248 from RESULT LIST 243 to PARKING LOT 90 or to a specific correspondence. An advisor can also select one or multiple reports or letters to be generated from RESULTS LIST 243 for each client/GROUP by dropping SEARCH ICON 248 onto REPORTS or LETTERS 87, respectively.

OS/2 WORKPLACE SHELL (WPS) application integration allows expanded functionality for system 5. With continued reference to FIG. 2, a workplace shell extension 24 (system object model (SOM) subclasses of existing WPS classes) is preferably part of DESKTOP 10. Workplace shell 24 suitably provides the dynamic behavior of application specific WPS objects/icons 25 based on communications between WPS extension 24 and APPLICATION 18. For example, menus offered to an advisor are dynamically constructed based on the state of the object which WPS object 25 represents within APPLICATION 18. In addition, WPS menu activities suitably activate specific application behavior outside of the standard WPS model. In a preferred embodiment, activating a specific application would cause the export facility to export the GROUP that is being interacted with in the WPS environment and that is represented by WPS object 25. Exporting is achieved by setting up and communicating via an interprocess communication mechanism. In a preferred embodiment, a shared memory segment and window message pass between the workplace shell (WPS) and the application to achieve this result. Application specific WPS objects 25 are preferably created by dragging various application icons representing GROUPS, PERSONS, ORGANIZATIONS, etc., and dropping them, as further described below, over the WPS DESKTOP 10. Next, WPS application specific objects 25 are suitably removed by dragging them to PUT AWAY 89.

Figure 18:
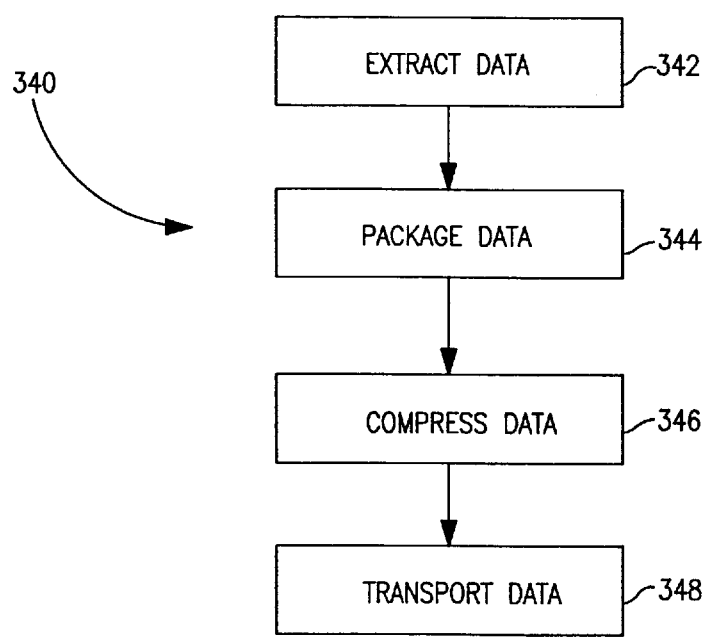
FIG. 18 is an exemplary flow diagram that illustrates an exemplary IMPORT routine in accordance with one aspect of the present invention.

An advisor suitably activates EXPORT GROUP 340 from CARD FILE 82, or by selecting the GROUP icon. EXPORT GROUP 340 allows an advisor to share information for one or more clients with an assistant or another advisor. More particularly, an exemplary EXPORT 340 routine is illustrated in FIG. 18. EXPORT GROUP 340 extracts the exemplar data (step 342) that represents the GROUP. The data is then packaged (step 344), and in a preferred embodiment, the EXPORT data is packaged in Smalltalk/V object filer format and later compressed (step 346) with a commercial file compression utility. Finally, the data is transported (step 348) via electronic mail, diskette, etc. In an alternative embodiment, EXPORT GROUP 340 creates an icon that is transported via Email or diskette.

The IMPORT process takes an Exported Group and reverses the aforementioned steps, bringing the exemplar data from the other local database into DATABASE 22. An advisor initiates the IMPORT process by dragging the icon that represents EXPORT GROUP 340 and dropping it onto PUT AWAY 89 icon or CARD FILE 82 icon.

As briefly discussed above, CALENDAR 86 preferably allows advisors to suitably schedule activities (meetings, phone calls, and to do items) and scan for open slots in their schedules. Advisors also use CALENDAR 86 to set TRIGGERS 365 and alarms, as explained below. When launched, CALENDAR 86 provides a day, week, and month view of activities. In a preferred embodiment, when reviewing to do items, an advisor assigns activities to an associate and then prints a report for the associate.

Figure 19:
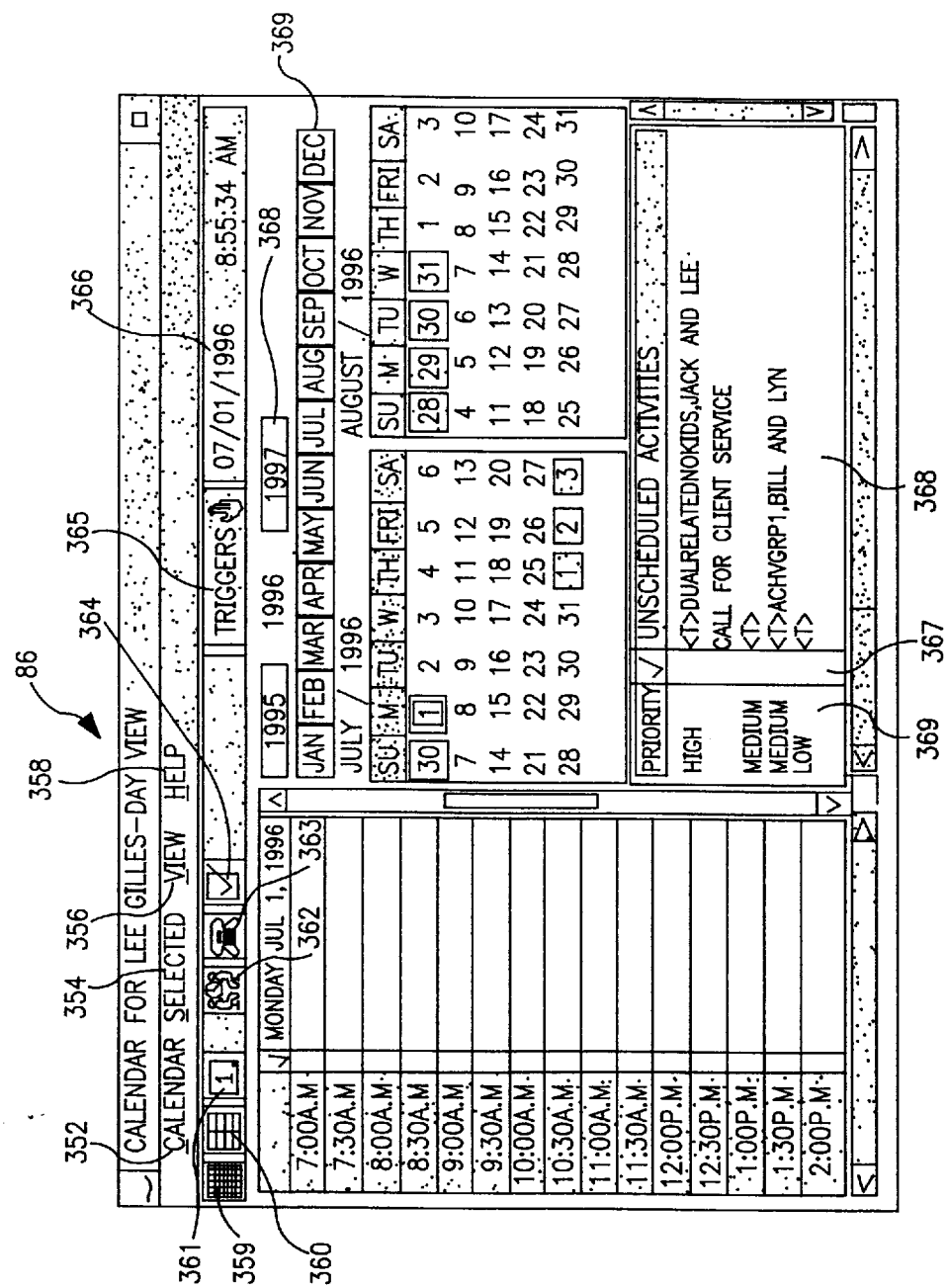
FIG. 19 is an exemplary CALENDAR screen view in accordance with one aspect of the present invention.

With reference to FIG. 19, CALENDAR 86 menu bar preferably includes CALENDAR 352, SELECTED 354, VIEW 356 and HELP 358. CALENDAR 86 action buttons preferably include MONTH VIEW 359, WEEK VIEW 369, DAY VIEW 361, MEETING 362, PHONE CALL 363, TODO'S 364 and TRIGGERS 365. The current date and time is constantly displayed 366 for easy reference.

MONTH VIEW 359 preferably displays scheduled events within the current month. Navigation to scheduled events in other months is preferably accomplished via a NEXT MONTH or LAST MONTH button. If a day of the month is selected, DAY View 361 will display that day. WEEK View 369 is similar to DAY View 361, but all activities are in a single line and are sorted by Meeting 362, Phone Calls 363 then ToDo's 364. A DAY ICON is suitably available on each day to quickly switch the display to DAY View 361. The DAY View 361 preferably includes timed activities spaced in ½ hour increments. A "check mark" 367 is suitably used to display or change the status of any activity. Navigation between days preferably includes the selection of the year 368 or month 369. Another section includes untimed (Unscheduled) activities 368, including ToDo's and phone calls, with a PRIORITY designation 369. If not completed, the tasks roll to the next day.

The menu bar of the MEETING VIEW 362 preferably includes Activity and HELP (not shown). The MEETING VIEW 362 contains a start date, start time, end date, end time, duration, meeting place, status, priority and a regarding entry (i.e. RE:). An advisor may suitably add or remove a GROUP, PERSON or PERSON responsible from any entry. When adding a GROUP, the GROUP is selected from the ACTIVITY View. Directions to the meeting are automatically incorporated into the MEETING VIEW 362 from the GROUP address View. An advisor can also set an alarm to remind an advisor of the scheduled meeting. The PHONE CALL View is similar to the MEETING VIEW 362. In a preferred embodiment, a duration of zero is an automatic indication of an unscheduled call. The TODO View is also similar to the MEETING VIEW 362, however the TODO View does not include end dates or durations.

In an alternative embodiment, an advisor suitably customizes CALENDAR 86 such that, when opening CALENDAR 86, either the Month 359, Week 360, or Day View 361 appears. An advisor also selects TRIGGERS 365, but preferably selects the specific event to be triggered. Meetings, phone calls and ToDos are set with automatic defaults, unless changed by an advisor. The alarm is suitably set, including loudness, snooze time (allows for multiple alarms), accompanying messages and duration.

In conjunction with CALENDAR 86, TRIGGERS 365 feature (accessed through CALENDAR 86 icon) permits advisors to conduct proactive client service by displaying relevant information (e.g., quit smoking date, age 70½, age 59½, client meetings, and phone calls, etc.) about clients. Some TRIGGERS 365 are set for weekly reminders (i.e., send ahead documents or quit smoking date), while other TRIGGERS 365 are set for monthly reminders (Set client service meetings, mailings, phone calls, 59½ year old, and 70½ year old). Thus, an advisor uses a TRIGGERS 365 to flag key events in a client's life. TRIGGERS 365 can be set up to run automatically at the startup of APPLICATION 18 or advisors can choose to run TRIGGERS 365 "manually" through CALENDAR 86. TRIGGERS 365 is an example of how, with reference to FIG. 1 and 2, APPLICATION 18 is suitably integrated with other activities on DESKTOP 10. Thus, APPLICATION 18 is suitably patterned after the way a corporation interacts with PERSONs, ORGANIZATIONs and GROUPs.

With reference to FIG. 5, in a preferred embodiment, LETTERS 87 suitably provides access to many frequently used letters, free form and mail merge, that advisors repeatedly send to a PERSON, GROUP, or ORGANIZATION. Both types of letters allow advisors to "merge" information unique to PERSON, ORGANIZATION or GROUP, e.g., salutation name, address, etc.. The use of the DRAG and DROP 370 feature (see FIG. 20) eliminates the need for repeatedly inputting the data because the data that was previously entered into CARD FILE 82 can simply be dropped onto LETTER ICON 87. Dropping onto LETTER ICON 87 distributes the demographical data into a mail merge APPLICATION 18. AMIPRO v3.0b (r30.963.0) interfaces with APPLICATION 18 to allow the FINANCIAL Advisor and LETTERS 87 functions to print documents from a word processor, and its use for this purpose is generally known.

LETTERS 87 menu bar preferably includes DOCUMENT, View AND HELP. The LETTER View has four columns including Document name, FF (free form) or MM (mail merge), Category and Sub-category. Each letter is a target for DRAG and DROP 370 (see FIG. 20). Export of a letter goes directly to drive A (a diskette) and import looks to drive A for an incoming letter. A dialog box "About to Import" is displayed before completion.

With again reference to FIG. 5, in a preferred embodiment, FRONT PANEL 80 preferably includes PUT AWAY 89. PUT AWAY 89 icon suitably removes an icon from FRONT PANEL 80 or PARKING LOT 90, thereby allowing an advisor to clean up DESKTOP 10 and/or PARKING LOT 90. By dragging an entity icon to PUT AWAY icon 89, APPLICATION 18 re-files the entity in the appropriate location. Import, as found in export/import function 340 for a GROUP, as described above, is suitably completed by dropping the import icon onto PUT AWAY 89 icon.

With continued reference to FIG. 5, in a preferred embodiment, FRONT PANEL 80 preferably includes PARKING LOT 90. PARKING LOT 90 suitably allows an advisor to store a PERSON, ORGANIZATION, or GROUP icon on a temporary basis. When an icon resides in PARKING LOT 90, an advisor can perform icon drop operations on the icon. PARKING LOT 90 is actually more like a Parking Space, in that it allows residence of only one icon at a time. If an advisor drops a GROUP icon into PARKING LOT 90 while another icon is parked in PARKING LOT 90, the first icon is refiled in CARD FILE 82 and the second icon is displayed in PARKING LOT 90. Placing an icon in PARKING LOT 90, rather than on DESKTOP 10, increases its visibility and accessibility, even when multiple windows and/or applications 18 are open.

With continued reference to FIG. 5, in a preferred embodiment, FRONT PANEL 80 preferably includes ADVISOR BUTTON 94. Advisor BUTTON 94 suitably provides access to views that allow advisors to record information about themselves and their associates. The information preferably includes names, ID numbers, address, and phone numbers. ID numbers are used in addition to USER ID and PASSWORD for validation purposes. When used in combination with LETTERS 87, an advisor can create personalized stationery and proposals. Furthermore, a supervising advisor can access this information or give access rights to others. ADVISOR 94 preferably includes Advisor, View and HELP. View allows entry of advisors name, address, title, up to three phone numbers, advisor number, professional designation, and advisor type. The associate view allows the advisor to select a "person responsible" for assigning activities in CALENDER 86.

In a preferred embodiment, an advisor initializes applications 18 by suitably dragging and dropping 370 a PERSON, ORGANIZATION, GROUP, or OTHER defined icons onto CALENDAR 86, FINANCIAL 88, LETTERS 87 or PARKING LOT 90. In a preferred embodiment, DRAG and DROP 370 is a function of OS/2 which is a commonly known operating system. Specifically, DRAG and DROP 370 preferably includes the options of:
1. Drop a GROUP or PERSON on CALENDAR 86 Icon which suitably establishes a connection to the GROUP or PERSON on the activity that has been previously determined by an advisor.
2. Drop a SEARCH RESULT, GROUP, PERSON or ORGANIZATION onto a specific letter which suitably merges the selected letter with the information, i.e., the merge information associated with the GROUP or GROUPs.

In addition, an advisor can initialize other actions using the DRAG and DROP 370 feature. Specifically, DRAG and DROP 370 preferably includes the additional options of:
3. Drop an icon on PUT AWAY 89, as previously defined.
4. Drop a GROUP, PERSON, ORGANIZATION, MEETING, TODO, PHONE CALL, or EXTERNAL ADVISOR 490 on DESKTOP 10.
5. Drop a GROUP or PERSON on ACTIVITY View. This action establishes a connection to the client or GROUP and the activity that is being scheduled.
6. Drop a MEETING ICON 362, PHONE CALL ICON 363 or TODO ICON 364 on a new day 361 (FIG. 19) which suitably reschedules the activity on that day with the same times, descriptions and other attributes of the ACTIVITY.
7. Drop a MEETING ICON 362, PHONE CALL ICON 363, or TODO ICON 364 on a new time which suitably reschedules the activity with a new time while all the other attributes for the activity stay the same.
8. Drop a GROUP, PERSON, ORGANIZATION or SEARCH RESULT onto the PARKING LOT 90, as previously defined.

Figure 21:
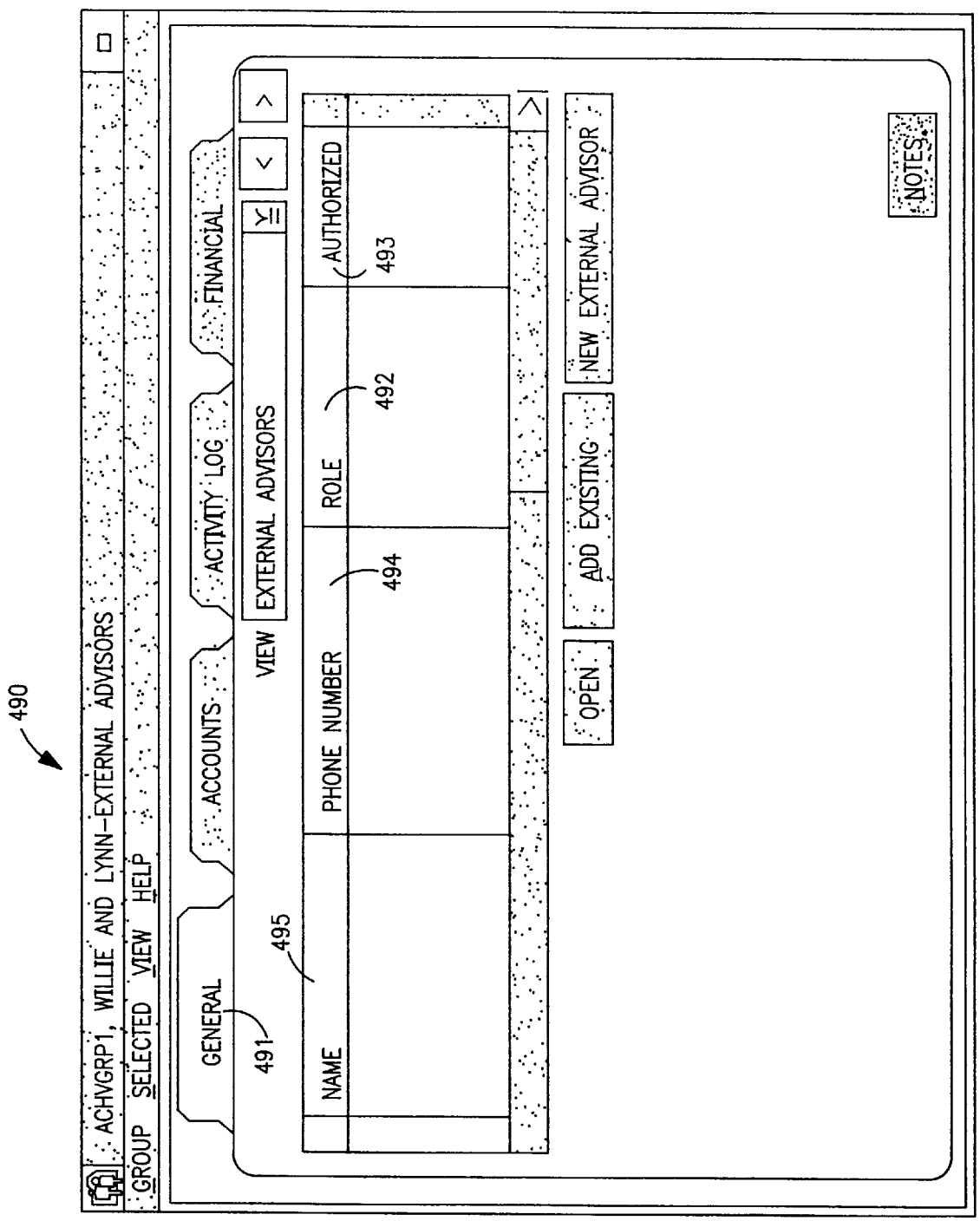

EXTERNAL ADVISOR 490 preferably includes all other professionals (e.g., attorneys, accountants, property casualty agents, bankers, life insurance agents, stockbrokers) providing service to a CLIENT GROUP in DB2/2 DATABASE 22. With reference to FIG. 21, in a preferred embodiment, under General View 491 an EXTERNAL ADVISOR 490 is preferably be selected, thus enabling the tracking of each CLIENT GROUP's EXTERNAL ADVISOR(s) 490. EXTERNAL ADVISOR 490 information preferably includes EXTERNAL ADVISOR's role 492, whether EXTERNAL ADVISOR 490 is authorized to share information 493, and various data 494, 495 about EXTERNAL ADVISOR 490. Advisors use this feature to build alliances with attorneys or CPAs because of their shared CLIENT GROUPS. For example, joint seminars on tax law changes may need input from both an attorney and financial expert, so the GROUP's two advisors can develop a team approach to servicing GROUPS. Other tabs and buttons provide similar features, as discussed previously.

With reference to FIG. 16, in a preferred embodiment, REPORT GENERATOR 249 suitably uses RESULT LIST 243 as input and generates specific reports utilizing a separate report writer. REPORT GENERATOR 249 preferably operates in a separate process so as to not block APPLICATION 18 while the report is being generated. The report writer uses standard SQL to access DATABASE 22 for the contents of the generated reports.

An exemplary listing of the reports provided by REPORT GENERATOR 249 includes:
CALENDAR Reports
Birthday Report
GROUP Activity Report
SELECTED ADDRESS Report
Phone Report
EXTERNAL ADVISOR Report
client GROUP List Report
client Account Report
Practice Management Report
Employee Report
Service Date Report
Consolidated Account Activity Report
Advisor Activity Report
Financial Advisory Proposal Account Setup Form Additionally, a report that accompanies GLOBAL REFRESH 97 indicates which clients and/or GROUPs are new since the last REFRESH.

To print a report, an advisor chooses the report from a list from a list in ADVISOR VIEW, CALENDAR 86 View, Search 84 window, or the pop-up window that appears by selecting the GROUP or CALENDAR 86 icon. An advisor then simply selects the "Print Report" button 249. In a preferred embodiment, an advisor sorts the reports and chooses a specific date range for the reports. Specifically, the reports are derived from the SMALL TALK CODE, the REX programs and a POPULATE program that is downloaded by MAINFRAME 40 during a GROUP REFRESH 95 that runs against the microfocus cobalt program.

It will be appreciated that the foregoing detailed description of a preferred embodiment of the present invention is representative of a type of client management system within the scope and spirit of the present invention. Further, those skilled in the art will recognize that various changes and modifications may be made without departing from the true spirit and scope of the present invention. Those skilled in the art will recognize that the invention is not limited to the specifics as shown here, but is claimed in any form or modification falling within the scope of the appended claims. For that reason, the scope of the present invention is set forth in the following claims.

We claim:

1. A system for grouping consumers into marketable segments for improved financial advising by a financial advisor, said system comprising:

a computing device configured to operate a financial planning application program, said computing device having at least one local database configured to include data fields including at least one of local data fields, client data fields, prospect data fields, person data fields, group data fields and organization data fields;

each of said consumers having a plurality of local data fields associated therewith wherein each of said local data fields is configured to contain demographic and financial information related to each of said consumers;

a plurality of client data fields, wherein each client data field is configured to include a subset of said consumers having local data fields which are classified as a specific client of said financial advisor, wherein said client data field includes a unique client ID, said client data field configured to include consumers having similar local data fields to allow coordination and manipulation of consumers within said client data field;

a plurality of prospect data fields, wherein each prospect data field is configured to include a subset of said consumers having local data fields which are classified as a specific prospect of said financial advisor, wherein said prospect data field includes a unique prospect ID, said prospect data field configured to include consumers having similar local data fields to allow coordination and manipulation of consumers within said prospect data field;

a plurality of person data fields, wherein each person data field is configured to include a subset of said consumers having local data fields which are classified as a specific person of said financial advisor, wherein said person data field includes a unique person ID, said person data field configured to include consumers having similar local data fields to allow coordination and manipulation of consumers within said person data field;

a plurality of group data fields, wherein each group data field is configured to include a subset of said consumers having local data fields which are classified in a specific group of said financial advisor, wherein said group data field includes a unique group ID, said group data field configured to include consumers having similar local data fields to allow coordination and manipulation of consumers within said group data field; and, a plurality of organization data fields, wherein each organization data field is configured to include a subset of said consumers having local data fields which are classified in a specific organization of said financial advisor, wherein said organization data field includes a unique organization ID, said organization data field configured to include consumers having similar local data fields to allow coordination and manipulation of consumers within said organization data field.

2. The system of claim 1, wherein said computing device includes temporary data files, application software, a database manager and data extract.

3. The system of claim 1, wherein said financial planning applications of said computing device are object oriented applications.

4. The system of claim 1, further including a middleware communicating with said computing device, said middleware having staging and network connections, and a mainframe communicating with said middleware, said mainframe including a host database configured to include a plurality of host data fields.

5. The system of claim 4, further including a refresh routine configured to communicate with said mainframe and update said local database, said refresh routine configured to update at least one of a plurality of local data fields with said host data fields.

6. The system of claim 4, wherein said refresh routine further includes substantially real-time access to said host database.

7. The system of claim 4, further including an export routine, said export routine configured to export said local data fields to at least one of a local database of another computing device and said host database.

8. The system of claim 1, further including a search engine configured to search local data fields and create search result lists, said search engine successively subtracts consumers, thereby resulting in a search result list.

9. The system of claim 1, wherein said local data field includes gender local data fields, address local data fields, financial information local data fields and relationship local data fields.

10. The system of claim 1, wherein said local data field includes greater than 50 local data fields for each of said consumers.

11. The system of claim 1, further including a means for providing substantially real time financial information about said consumers.

12. The system of claim 1, wherein said system further includes a system of triggering at least one of a predetermined time and a predetermined frequency of client contacts, said time and frequency being based upon an employer's goals.

13. The system of claim 1 further including a drag and drop routine configured to initialize applications with said data fields.

14. The system of claim 13, wherein said drag and drop routine includes a routine configured to drop a data field on an activity data field within a calendar icon to incorporate said data fields into said activity data field.

15. The system of claim 13, wherein said drag and drop routine includes a routine configured to drop at least one search result icon having a plurality of data fields onto an

37 electronic correspondence icon having a plurality of data fields to merge said correspondence data fields with said search result data fields, said search result data fields representing a predetermined combination of said card file data fields.

16. The system of claim 13, wherein said drag and drop routine includes a routine configured to drop said data field on a put away application to store said data field.

17. The system of claim 13, wherein said drag and drop routine includes a routine configured to drop at least one of said data fields and said search result icon on a parking lot application to temporarily store said icon.

18. A method for grouping consumers into marketable segments for improved financial advising by a financial advisor, said method comprising the steps of:

operating, via a computing device, a financial planning application program, said computing device having at least one local database configured to include data fields including at least one of local data fields, client data fields, prospect data fields, person data fields, group data fields and organization data fields;

associating a plurality of local data fields with each of said wherein each of said local data fields is configured to contain demographic and financial information related to each of said consumers;

providing a plurality of client data fields, wherein each client data field is configured to include a subset of said consumers having local data fields which are classified as a specific client of said financial advisor, wherein said client data field includes a unique client ID, said client data field configured to include consumers having similar local data fields to allow coordination and manipulation of consumers within said client data field;

providing a plurality of prospect data fields, wherein each prospect data field is configured to include a subset of said consumers having local data fields which are classified as a specific prospect of said financial advisor, wherein said prospect data field includes a unique prospect ID, said prospect data field configured to include consumers having similar local data fields to allow coordination and manipulation of consumers within said prospect data field;

providing a plurality of person data fields, wherein each person data field is configured to include a subset of said consumers having local data fields which are classified as a specific person of said financial advisor, wherein said person data field includes a unique person ID, said person data field configured to include consumers having similar local data fields to allow coordination and manipulation of consumers within said person data field;

providing a plurality of group data fields, wherein each group data field is configured to include a subset of said consumers having local data fields which are classified in a specific group of said financial advisor, wherein said group data field includes a unique group ID, said group data field configured to include consumers having similar local data fields to allow coordination and manipulation of consumers within said group data field; and, providing a plurality of organization data fields, wherein each organization data field is configured to include a subset of said consumers having local data fields which are classified in a specific organization of said financial advisor, wherein said organization data field includes a unique organization ID, said organization data field

38 configured to include consumers having similar local data fields to allow coordination and manipulation of consumers within said organization data field.

19. The method of claim 18 further including the step of searching data fields and creating search result lists, said searching step includes successively subtracting said data fields.

20. The method of claim 18, further including the step of communicating with said computing device via a middleware, and the step of communicating with said middleware via a mainframe having a host database configured to include a plurality of host data fields.

21. The method of claim 20 further including the step of communicating with said mainframe and updating at least one of a plurality of data fields with said host data fields.

22. The method of claim 20 further including the step of accessing said host database in substantially real-time.

23. The method of claim 20, further including the step of exporting said local data fields to at least one of a local database of another computing device and said host database.

24. The method of claim 18, wherein said step of providing said data fields includes providing greater than 50 data fields for each of said consumers.

25. The method of claim 18 further including the step of assigning unique identification numbers to consumers, said consumers having data fields associated therewith, including the steps of:

providing a plurality of computing devices, each of said computing devices having a number within a unique number range;

providing a global name space having a user identification and password for each of said computing devices;

assigning said number to said client names; and, storing said number and said client names in said global name space, thereby ensuring that a unique said number is assigned to each said client.

26. The method of claim 18 further including the step of limiting the use of software, said software located within said computing device, said limiting step comprising the steps of:

booting said computing device;

providing a counter, whereby said counter establishes a value based upon the number of times said booting step occurs without local database being at least one of updating, backing-up and restoring by said host database;

providing a predetermined value, whereby said predetermined value is the maximum number of times that said booting step may occur without local database being at least one of updated, backed-up and restored by said host database;

comparing said predetermined value with said counter value, thereby determining if said predetermined value is exceeded; and, upon exceeding said predetermined value, restricting access to said host mainframe.

27. The method of claim 18 further including the step of providing substantially real-time financial information about said consumers.

28. The method of claim 18 further including the step of triggering at least one of a predetermined time and a predetermined frequency of consumer contacts, said time and frequency being based upon an employer's goals.

29. The method of claim 18 further including the step of initializing applications with said data fields via a drag and drop routine.

30. The method of claim 29 further including the step of dropping a data fields on an activity data field within a calendar icon to incorporate said data fields into said activity data field.

31. The method of claim 29 further including the step of dropping at least one search result icon having a plurality of data fields onto an electronic correspondence icon having a plurality of data fields to merge said correspondence data fields with said search result data fields, said search result data fields representing a predetermined combination of said data fields.

32. The method of claim 29 further including the step of dropping said data fields on a put away application to store said card file icon.

33. The method of claim 29 further including the step of dropping at least one of said data fields and said search result icon on a parking lot application to temporarily store said data fields.

* * * * *